(12) United States Patent
Mitani et al.

(10) Patent No.: US 8,663,357 B2
(45) Date of Patent: Mar. 4, 2014

(54) HOLDING SEALING MATERIAL, EXHAUST GAS PURIFYING APPARATUS, AND METHOD FOR MANUFACTURING EXHAUST GAS PURIFYING APPARATUS

(75) Inventors: Kenichi Mitani, Takahama (JP); Takahiko Okabe, Takahama (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 0 days.

(21) Appl. No.: 13/459,027

(22) Filed: Apr. 27, 2012

(65) Prior Publication Data
US 2012/0311982 A1 Dec. 13, 2012

(30) Foreign Application Priority Data
Apr. 28, 2011 (JP) ................. 2011-102296

(51) Int. Cl.
*B01D 39/14* (2006.01)
*B01D 39/06* (2006.01)
*B01D 24/00* (2006.01)
*B01D 50/00* (2006.01)

(52) U.S. Cl.
USPC ........... 55/523; 55/522; 55/524; 422/169; 422/170; 422/171; 422/172; 422/177; 422/178; 422/180; 422/181; 422/182; 422/179

(58) Field of Classification Search
USPC ............. 55/522–524; 422/169–172, 177–182
See application file for complete search history.

(56) References Cited

U.S. PATENT DOCUMENTS

| | | | |
|---|---|---|---|
| 4,048,363 A * | 9/1977 | Langer et al. | 428/77 |
| 5,332,609 A | 7/1994 | Corn | |
| 6,670,020 B1 * | 12/2003 | Maus | 428/116 |
| 6,967,006 B1 * | 11/2005 | Wirth et al. | 422/179 |
| 8,017,085 B2 * | 9/2011 | Fernandes, Jr. | 422/179 |
| 2009/0269255 A1 * | 10/2009 | Yoshimi et al. | 422/179 |
| 2011/0023430 A1 | 2/2011 | Kumar et al. | |

FOREIGN PATENT DOCUMENTS

| | | |
|---|---|---|
| EP | 0396330 | 11/1990 |
| EP | 2112342 | 10/2009 |
| EP | 2299074 | 3/2011 |
| JP | 2007-218221 | 8/2007 |

* cited by examiner

*Primary Examiner* — Amber Orlando
(74) *Attorney, Agent, or Firm* — Ditthavong Mori & Steiner, P.C.

(57) ABSTRACT

A holding sealing material includes a plurality of mats and at least one belt-shaped body. The plurality of mats include inorganic fibers and are layered. The plurality of mats are bundled by the at least one belt-shaped body. The at least one belt-shaped body has no fixing force which fixes the plurality of mats to the at least one belt-shaped body.

42 Claims, 16 Drawing Sheets

A-A line cross-sectional view

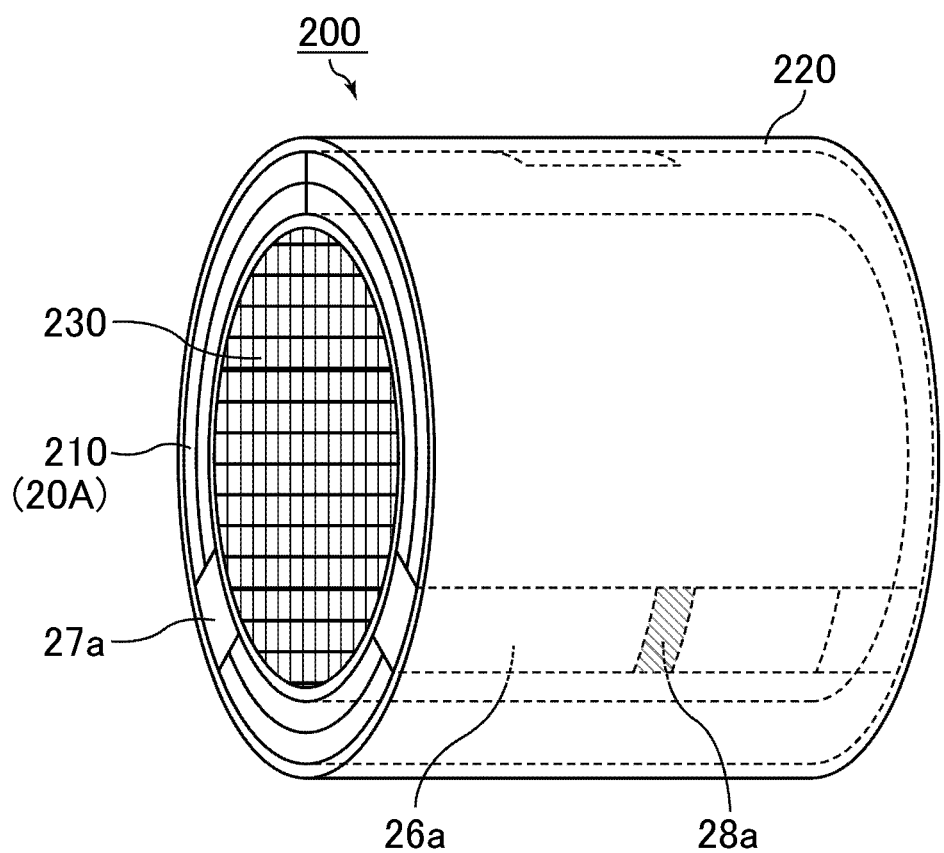

HOLDING SEALING MATERIAL, EXHAUST GAS PURIFYING APPARATUS, AND METHOD FOR MANUFACTURING EXHAUST GAS PURIFYING APPARATUS

CROSS-REFERENCE TO RELATED APPLICATIONS

The present application claims priority under 35 U.S.C. §119 to Japanese Patent Application No. 2011-102296, filed on Apr. 28, 2011, the contents of which are incorporated herein by reference in their entirety.

BACKGROUND OF THE INVENTION

1. Field of the Invention

The present invention relates to a holding sealing material, an exhaust gas purifying apparatus, and a method for manufacturing an exhaust gas purifying apparatus.

2. Discussion of the Background

Exhaust gas discharged out of an internal combustion engine of a diesel engine or the like contains particulate matter such as soot (hereinafter, sometimes referred to as PM) and in recent years, that PM causes harm on the environments and human being has drawn attention as a big issue. Since exhaust gas further contains harmful gaseous components such as CO, HC, and $NO_x$, the effects of the harmful gaseous components on the environments and human being also have become a serious concern.

Therefore, as an exhaust gas purifying apparatus for collecting PM in exhaust gas or purifying harmful gaseous components, there are proposed various kinds of exhaust gas purifying apparatuses composed of an exhaust gas treating body made of a porous ceramic such as silicon carbide, cordierite, or the like, a casing for housing the exhaust gas treating body, and a holding sealing material including inorganic fibers and provided between the exhaust gas treating body and the casing. This holding sealing material is installed mainly for the purpose of preventing the exhaust gas treating body from contact with the casing covering its circumference and breakage due to the vibrations and impacts generated during the driving of an automobile, or preventing exhaust gas from leaking between the exhaust gas treating body and the casing.

Herein, since an internal combustion engine is to be driven in condition close to the theoretic air/fuel ratio in order to improve the fuel performance, the exhaust gas tends to become at high temperature and high pressure. When the exhaust gas at a high temperature and high pressure comes to an exhaust gas purifying apparatus, the distance between an exhaust gas treating body and a casing fluctuates due to the difference of their thermal expansion coefficients. That is, the distance between the exhaust gas treating body and the casing becomes wider at a high temperature than at a low temperature. Therefore, the holding sealing material is required to have enough holding power for the exhaust gas treating body to keep the position of the exhaust gas treating body in spite of some fluctuation of the distance. Further, in order to efficiently extract exhaust gas treatment function of the exhaust gas treating body, a requirement for the holding sealing material having a heat insulating property for keeping the temperature of the exhaust gas treating body has been becoming high.

In order to satisfy these requirements, in recent years, a designing means is employed in which the thickness of a holding sealing material is made thick to heighten the heat insulating property. With respect to such a holding sealing material, in order to assure repulsive force of inorganic fibers from which the holding power is mainly derived, it is necessary to increase the weight per unit surface area of the holding sealing material.

However, as the thickness of the holding sealing material becomes thicker, it becomes more difficult to obtain sufficient peel strength by needling treatment carried out in a production process for increasing the peel strength in the thickness direction, and there occurs a problem that significant shearing deformation or the like of the holding sealing material is caused in the case an exhaust gas treating body wound with the holding sealing material is stuffed in a casing.

On the other hand, it is also proposed to obtain a holding sealing material with an increased weight by combining a plurality of mats with a weight same as that of a conventional one but not by changing the thickness of each holding sealing material. As an example of such a holding sealing material, there is disclosed a holding sealing material obtained by layering a plurality of mats in JP-A 2007-218221.

With respect to a conventional holding sealing material disclosed in JP-A 2007-218221, a plurality of mats are fixed to one another by bundling parts by sewing machining.

The contents of JP-A 2007-218221 are incorporated herein by reference in their entirety.

SUMMARY OF THE INVENTION

According to one aspect of the present invention, a holding sealing material includes a plurality of mats and at least one belt-shaped body. The plurality of mats include inorganic fibers and are layered. The plurality of mats are bundled by the at least one belt-shaped body. The at least one belt-shaped body has no fixing force which fixes the plurality of mats to the at least one belt-shaped body.

According to another aspect of the present invention, an exhaust gas purifying apparatus includes a casing, an exhaust gas treating body housed in the casing, and a holding sealing material wound on a circumference of the exhaust gas treating body and provided between the exhaust gas treating body and the casing. The holding sealing material includes a plurality of mats including inorganic fibers and being layered, and at least one belt-shaped body. The plurality of mats are bundled by the at least one belt-shaped body. The at least one belt-shaped body has no fixing force which fixes the plurality of mats to the at least one belt-shaped body.

According to further aspect of the present invention, a method for manufacturing an exhaust gas purifying apparatus includes housing an exhaust gas treating body in a casing. The exhaust gas treating body is wound with a holding sealing material on a circumference of the exhaust gas treating body so that the holding sealing material is provided between the exhaust gas treating body and the casing after the housing of the exhaust gas treating body. The holding sealing material includes a plurality of mats which include inorganic fibers and which are layered and at least one belt-shaped body. The plurality of mats are bundled by the at least one belt-shaped body. The at least one belt-shaped body has no fixing force which fixes the plurality of mats to the at least one belt-shaped body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 9 is a perspective view schematically showing one example of the exhaust gas purifying apparatus according to the second embodiment of the present invention;

DESCRIPTION OF THE EMBODIMENTS

Figure 1A:
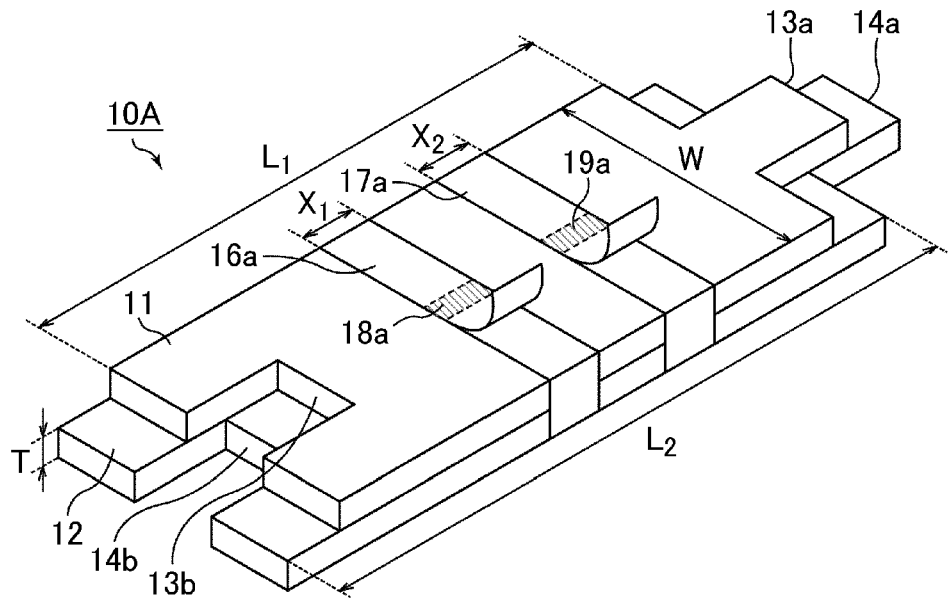
FIG. 1A and FIG. 1B are perspective views schematically showing one example of a holding sealing material according to a first embodiment of the present invention.

The holding sealing material according to an embodiment of the present invention includes a plurality of layered mats and is excellent in the winding property (workability at the time of winding the holding sealing material on the circumference of an exhaust gas treating body). Moreover, the holding sealing material according to the embodiment of the present invention is used in the exhaust gas purifying apparatus according to an embodiment of the present invention and a method for manufacturing an exhaust gas purifying apparatus according to an embodiment of the present invention.

According to the embodiment of the present invention, mats tend to be shifted in the longitudinal direction by bundling a plurality of mats with a belt-shaped body having no fixing strength but not by fixing the mats to one another.

The holding sealing material according to the embodiment of the present invention includes a plurality of mats including inorganic fibers and being layered, and the plurality of mats are bundled by at least one belt-shaped body having no fixing force.

With respect to the holding sealing material according to the embodiment of the present invention, a plurality of mats are bundled by a belt-shaped body having no fixing force. Consequently, since the mats are not fixed to one another, the mats tend to be shifted in the longitudinal direction at the time of winding the mats on the circumference of an exhaust gas treating body. Therefore, even in the case the positioning of the mats is deviated, relative positioning among the mats tends to be adjusted finely at the time of winding the holding sealing material on the circumference of the exhaust gas treating body. As a result, the end faces of mats (end faces of the mats in the longitudinal direction side) tend to be fitted without any gap.

With respect to the holding sealing material according to the embodiment of the present invention, a plurality of mats are bundled by a belt-shaped body having a substantially constant width to the length of the mats (the length in the longitudinal direction of the mats). Consequently, positional deviation of the mats in the width direction tends to be prevented.

With respect to the holding sealing material according to the embodiment of the present invention, a belt-shaped body having no fixing force is used. Therefore, unlike the case of fixing a plurality of mats with an adhesive tape or the like, the use amount of an organic component tends to be saved.

With respect to the holding sealing material according to the embodiment of the present invention, even if layering of a plurality of mats is failed, the layering is more likely to be done again by removing the belt-shaped body by cutting or the like and it is less likely to be accompanied with a problem of damaging the mats. As described, with respect to the holding sealing material according to the embodiment of the present invention, use of materials necessary for producing the holding sealing material in vain tends to be suppressed.

With respect to the holding sealing material according to the embodiment of the present invention, groove parts are desirably so formed as to fix the belt-shaped body in first end faces and second end faces of the mats in the width direction.

When groove parts are formed in end faces of the mats in the width direction, the position of the belt-shaped body tends to be fixed by the groove parts, and therefore positional deviation of the mats in the width direction tends to be further prevented.

In addition, even in the case of the holding sealing material mentioned above, since the mats are not fixed to one another, fine adjustment of relative positions of the mats tends to be carried out.

With respect to the holding sealing material according to the embodiment of the present invention, the plurality of mats are desirably bundled by two or more of the belt-shaped bodies.

When a plurality of mats are fixed at two or more points, the positional deviation of the mats in the width direction tends to be prevented better. It is because fixed ends exist in at least one end part side in observation of both end parts of the holding sealing material from the respective belt-shaped bodies and the degree of freedom of the positional deviation of the mats in the width direction tends to be considerably limited.

With respect to the holding sealing material according to the embodiment of the present invention, in the case the plurality of mats are bundled with one belt-shaped body, the width of the belt-shaped body is desirably about 30% or less of the length of the mats in the longitudinal direction, and in the case the plurality of mats are bundled with two or more belt-shaped bodies, the distance between the end of a belt-shaped body nearest to first end faces of the mats in the longitudinal direction and the end of a belt-shaped body nearest to second end faces of the mats in the longitudinal direction is desirably about 30% or less of the length of the mats in the longitudinal direction.

If the distance in the holding sealing material is about 30% or less, the surface area of the belt-shaped bodies to the surface area of the holding sealing material (mats) tends not to be too wide, and thus the holding force of the holding sealing material tends not to be lowered.

It is supposed that in the case a material composing the belt-shaped bodies is an organic substance such as paper or a film, if the surface area of the belt-shaped bodies becomes small, the organic components of the belt-shaped bodies to be heated and decomposed by the heat of the exhaust gas could be decreased when the holding sealing material is used for an exhaust gas purifying apparatus. It is supposed that the heated and decomposed organic components having fluidity then tend not to lower the friction between the mats (holding sealing material) and the casing composing an exhaust gas purifying apparatus or the friction between the mats (holding sealing material) and exhaust gas treating body and therefore, the holding force of the holding sealing material is less likely to be lowered.

With respect to the holding sealing material according to the embodiment of the present invention, the width of one belt-shaped body is desirably from about 10 mm to about 100 mm.

If the width of one belt-shaped body is about 10 mm or more, in the case the number of the belt-shaped bodies is one, the width for fixing a plurality of mats is not too narrow, and thus a sufficient effect of preventing the positional deviation of the mats in the width direction is more likely to be obtained. On the other hand, if the width of one belt-shaped body is about 100 mm or less, in the case the number of the belt-shaped bodies is high, the surface area of the belt-shaped bodies to the surface area of the holding sealing material is not too large, and thus the holding force of the holding sealing material tends not to be lowered. As described above, it is because in the case a material composing the belt-shaped bodies is an organic substance such as paper or a film, if the surface area of the belt-shaped bodies becomes small, the organic components of the belt-shaped bodies to be heated and decomposed by the heat of the exhaust gas could supposedly be decreased when the holding sealing material is used for an exhaust gas purifying apparatus.

With respect to the holding sealing material according to the embodiment of the present invention, the belt-shaped body is desirably made of paper or a film.

With respect to the holding sealing material according to the embodiment of the present invention, the belt-shaped body is desirably made of a film, and a material composing the film is more desirably polyethylene or polyolefin.

Paper or a film is preferably used as a belt-shaped body having no fixing strength between the mat surface and the belt-shaped body. Paper or a film is also desirable since it is easily made available.

With respect to the holding sealing material according to the embodiment of the present invention, at least one end part of the belt-shaped body in the longitudinal direction is desirably stuck on the belt-shaped body by an adhesive part.

For example, along tape having substantially constant width is prepared, and then the tape is cut after wound on the circumference of a plurality of mats and at least one end of the tape is stuck to the tape so that the belt-shaped body is more likely to be manufactured. Consequently, a belt-shaped body corresponding to the number (thickness) of mats to be bundled is more likely to be manufactured.

With respect to the holding sealing material according to the embodiment of the present invention, desirably at least one of printing and coloring for displaying identification data of the mats is done on the belt-shaped body.

When the identification data of the mats is displayed on the belt-shaped body, the identification data of the mats tends to be confirmed by seeing the belt-shaped body. For example, if the identification data of the front or rear face of the holding sealing material is provided to the belt-shaped body, even an unskilled worker tends to easily determine the front or rear face of the holding sealing material.

With respect to the holding sealing material according to the embodiment of the present invention, desirably at least one of the above-mentioned printing and the above-mentioned coloring is done on a portion of the belt-shaped body positioned on at least one of first end faces and second end faces of the mats in the width direction.

When the identification data of the mats is displayed on the above-mentioned position of the belt-shaped body, the identification data of the mats tends to be confirmed by seeing the belt-shaped body even after the holding sealing material is wound on the circumference of the exhaust gas treating body. The identification data may be supposed to be, for example, identification data of rot number and production history of the holding sealing material.

With respect to the holding sealing material according to the embodiment of the present invention, at least one of the above-mentioned printing and the above-mentioned coloring is desirably done with an inorganic pigment.

When the printing and/or the coloring is done with an inorganic pigment on the belt-shaped body, the identification data on the belt-shaped body tends to be thermally transferred to the mat in the case the holding sealing material is used in a position such as in the neighborhood of an engine where it becomes a high temperature. Consequently, since it is no need to carry out printing and/or coloring of the identification data directly to the mat, the production efficiency of the holding sealing material tends to be improved.

Further, since an inorganic pigment has high heat resistance, the identification data tends to remain even in high temperature environments. Consequently, even in the case the holding sealing material is used in high temperature environments and thereafter becomes defective, the identification data such as production history of the holding sealing material tends to be confirmed.

An exhaust gas purifying apparatus according to the embodiment of the present invention includes a casing, an exhaust gas treating body housed in the casing, and a holding sealing material wound on the circumference of the exhaust gas treating body and provided between the exhaust gas treating body and the casing, and the holding sealing material is the holding sealing material according to the embodiment of the present invention.

With respect the exhaust gas purifying apparatus according to the embodiment of the present invention, since the holding sealing material according to the embodiment of the present invention is used as the holding sealing material, the holding sealing material tends to be wound on the circumference of the exhaust gas treating body without a gap. Consequently, leakage of exhaust gas and deterioration of durability of the exhaust gas purifying apparatus tend to be prevented.

With respect to the exhaust gas purifying apparatus according to the embodiment of the present invention, at least one end part of the belt-shaped body composing the holding sealing material in the longitudinal direction is desirably stuck on the belt-shaped body by an adhesive part, and the adhesive part of the belt-shaped body is desirably positioned on the main face of a mat in the opposed side to the side to be brought into contact with the exhaust gas treating body or on the main face of a mat in the side having contact with the exhaust gas treating body.

When the adhesive part of the belt-shaped body is positioned on the main face of a mat in the opposed side to the side to be brought into contact with the exhaust gas treating body, the belt-shaped body tends to be removed by peeling the adhesive part with no need of using a tool such as a pair of scissors.

On the other hand, when the adhesive part of the belt-shaped body is positioned on the main face of a mat in the side having contact with the exhaust gas treating body, at the time of housing the exhaust gas treating body wound with the holding sealing material in the casing, the adhesive part tends not to be hooked in the casing and thus the exhaust gas treating body wound with the holding sealing material is more likely to be housed in the casing.

With respect to the exhaust gas purifying apparatus according to the embodiment of the present invention, at least one end part of the belt-shaped body composing the holding sealing material in the longitudinal direction is desirably stuck on the belt-shaped body by an adhesive part, and the adhesive part of the belt-shaped body is desirably positioned on a first end face or a second end face of at least one of the mats in the width direction.

When the adhesive part of the belt-shaped body is not positioned on the main face of a mat, the exhaust gas treating body tends to be brought into contact with any side of the main face of the mat. Consequently, since it is no need to distinguish the front or rear of the holding sealing material at the time of winding the holding sealing material, the production efficiency of the exhaust gas purifying apparatus is more likely to be improved.

A method for manufacturing an exhaust gas purifying apparatus according to the embodiment of the present invention is a method for manufacturing an exhaust gas purifying apparatus including a casing, an exhaust gas treating body housed in the casing, and a holding sealing material wound on the circumference of the exhaust gas treating body and provided between the exhaust gas treating body and the casing. The method includes a step of housing the exhaust gas treating body wound with the holding sealing material according to the embodiment of the present invention in the casing.

By the method for manufacturing an exhaust gas purifying apparatus according to the embodiment of the present invention, the exhaust gas purifying apparatus according to the embodiment of the present invention can be manufactured.

The method for manufacturing an exhaust gas purifying apparatus according to the embodiment of the present invention desirably further includes a step of winding the holding sealing material on the circumference of the exhaust gas treating body before the housing step, and a holding sealing material in which at least one end part of the belt-shaped body in the longitudinal direction is desirably stuck on the belt-shaped body by an adhesive part and in which the adhesive part of the belt-shaped body is positioned on the main face of one of the mats is used as the holding sealing material. In the winding step, the holding sealing material is wound on the circumference of the exhaust gas treating body desirably in a manner that a main face of one of the mats in the opposed side to the side where the adhesive part of the belt-shaped body is positioned is brought into contact with the exhaust gas treating body, or a main face of one of the mats in the side where the adhesive part of the belt-shaped body is positioned is brought into contact with the exhaust gas treating body.

In the method for manufacturing an exhaust gas purifying apparatus according to the embodiment of the present invention, a holding sealing material in which at least one end part of the belt-shaped body in the longitudinal direction is desirably stuck on the belt-shaped body by an adhesive part and in which the adhesive part of the belt-shaped body is positioned on a first end face or a second end face of at least one of the mats in the width direction is desirably used as the holding sealing material.

The method for manufacturing an exhaust gas purifying apparatus according to the embodiment of the present invention desirably further includes a step of winding the holding sealing material on the circumference of the exhaust gas treating body before the housing step, and a step of removing the belt-shaped body composing the holding sealing material after the winding step and before the housing step.

By the method for manufacturing an exhaust gas purifying apparatus mentioned above, the belt-shaped body tends to be removed.

In the case a material composing the belt-shaped bodies is an organic substance such as paper or a film, the amount of the organic components of the belt-shaped bodies to be heated and decomposed by the heat of the exhaust gas is more likely to be decreased at the time of using the exhaust gas purifying apparatus by removing the belt-shaped body.

In the method for manufacturing an exhaust gas purifying apparatus according to the embodiment of the present invention, a holding sealing material including the plurality of mats bundled by two or more of the belt-shaped bodies and in which at least one of printing and coloring for displaying identification data of the mats is done on the belt-shaped bodies is desirably used as the holding sealing material, and in the removing step, desirably only a belt-shaped body bearing unnecessary identification data is removed.

In the method for manufacturing an exhaust gas purifying apparatus mentioned above, since a belt-shaped body on which unnecessary identification data is displayed tends to be removed, confusion in the manufacturing process tends to be prevented. Further, in the case of manufacturing an exhaust gas purifying apparatus using a holding sealing material having, for example, a belt-shaped body displaying the our own manufacture's information and a belt-shaped body displaying the customer information, only the belt-shaped body displaying the our own manufacture's information tends to be removed before the exhaust gas purifying apparatus is transferred to the customer.

The embodiments will now be described with reference to the accompanying drawings, wherein like reference numerals designate corresponding or identical elements throughout the various drawings. However, the present invention should not be limited to the following embodiments, and modifications can be made without departing from the spirit and scope of the present invention.

First Embodiment

Hereinafter, a first embodiment which is one embodiment of a holding sealing material, an exhaust gas purifying apparatus, and a method for manufacturing an exhaust gas purifying apparatus of the present invention will be described.

At first, a holding sealing material according to the first embodiment of the present invention will be described.

The holding sealing material according to the first embodiment of the present invention is obtained by layering a plurality of mats including inorganic fibers and bundling the plurality of mats with two or more belt-shaped bodies having no fixing force. At least one end part of the belt-shaped bodies composing the holding sealing material in the longitudinal direction is stuck on the belt-shaped bodies by an adhesive part. The adhesive part of the belt-shaped bodies is positioned on the main face of the mat in the side to be brought into contact with an exhaust gas treating body in the case of manufacturing an exhaust gas purifying apparatus using the holding sealing material.

Figure 1B:
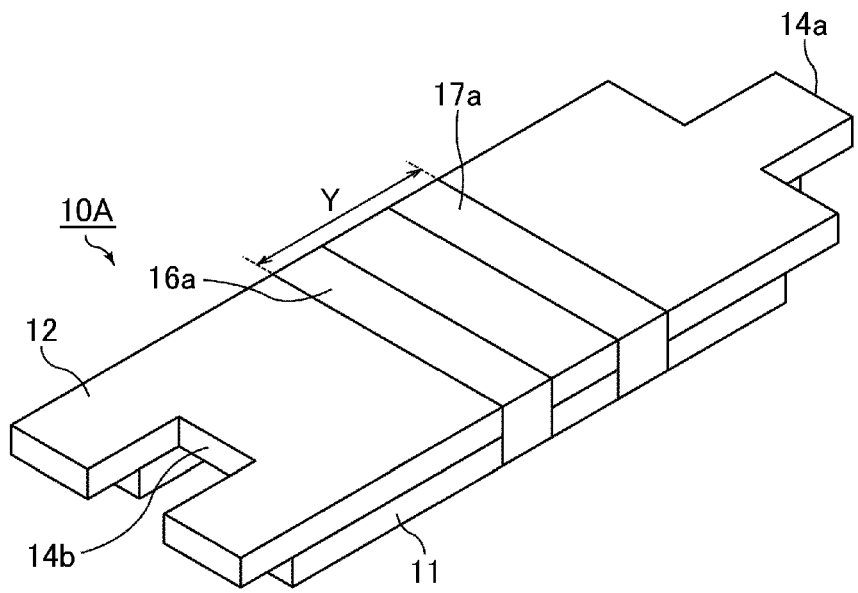

FIG. 1A and FIG. 1B are perspective views schematically showing one example of the holding sealing material according to the first embodiment of the present invention. FIG. 1A is a perspective view of the holding sealing material observed from a first mat side, and FIG. 1B is a perspective view of the holding sealing material observed from a second mat side.

As shown in FIG. 1A and FIG. 1B, with respect the holding sealing material 10A according to the first embodiment of the present invention, two mats (a first mat 11 and a second mat 12) having an approximately rectangular plane view and a prescribed length in the longitudinal direction (hereinafter, sometimes referred to simply as "whole length": shown by arrows "$L_1$" and "$L_2$" in FIG. 1A), width (shown by an arrow "W" in FIG. 1A) and thickness (shown by an arrow "T" in FIG. 1A) are layered. The whole length $L_1$ of the first mat 11 is shorter than the whole length $L_2$ of the second mat 12.

In the following explanation, in the case it is no need to particularly distinguish the first mat and the second mat, they may be described simply as mats.

In this description, the whole length of the mats is the length without taking the sizes of projected portions or recessed portions formed in the end parts of the mats into consideration. In FIG. 1A, the whole length of the first mat 11 is the length shown by an arrow "$L_1$" and the whole length of the second mat 12 is the length shown by an arrow "$L_2$".

In the holding sealing material 10A shown in FIG. 1A and FIG. 1B, a projected portion 13a is formed in one end part and a recessed portion 13b is formed in the other end part between the end parts of the first mat 11 in the longitudinal direction. A projected portion 14a is formed in one end part and a recessed portion 14b is formed in the other end part between the end parts of the second mat 12 in the longitudinal direction. The projected portion 13a and the recessed portion 13b of the first mat 11 as well as the projected portion 14a and the recessed portion 14b of the second mat 12 are so formed as to be fitted with each other when the holding sealing material 10A is wound on an exhaust gas treating body in order to assemble an exhaust gas purifying apparatus as described below.

With respect to the holding sealing material according to the first embodiment of the present invention, the mats composing the holding sealing material are desirable to be needled mats obtained by subjecting base mats including inorganic fibers to needling treatment. Needling treatment means inserting and pulling fiber entwining means such as needles in and out base mats.

With respect to the first mat 11 and the second mat 12 composing the holding sealing material 10A shown in FIG. 1A and FIG. 1B, inorganic fibers with a relatively long average fiber length are entwined three-dimensionally by needling treatment. The first mat 11 and the second mat 12 are subjected to the needling treatment in the width direction perpendicular to the longitudinal direction.

In order to form an entwined structure, the inorganic fibers have an average fiber length to a certain extent and for example, the average fiber length of the inorganic fibers is desirably from about 50 µm to about 100 mm.

With respect to the holding sealing material according to the first embodiment of the present invention, in order to suppress the bulkiness of the holding sealing material and improve the workability before assembly of an exhaust gas purifying apparatus, the mats composing the holding sealing material may include a binder such as an organic binder.

With respect the holding sealing material 10A shown in FIG. 1A and FIG. 1B, an example obtained by layering two mats with a thickness of from about 1.5 mm to about 15 mm is shown; however, in a holding sealing material according to the first embodiment of the present invention, the number of the mats to be layered is not particularly limited and may be three or more. A mat with the shortest whole length (sometimes, referred to also as shortest mat) among a plurality of mats is a mat wound on the circumference of an exhaust gas treating body, and next, a mat with whole length longer than that of the shortest mat is layered and thereafter, the whole length of mats becomes longer as the mats are layered more serially. In addition, in the case that the holding sealing material is composed of two mats (the first mat 11 and the second mat 12) such as the holding sealing material 10A shown in FIG. 1A and FIG. 1B, one mat (the first mat 11) with shorter whole length than the other is called as the shortest mat.

In the holding sealing material 10A shown in FIG. 1A and FIG. 1B, the first mat 11 and the second mat 12 are bundled with two belt-shaped bodies (a first belt-shaped body 16a and a second belt-shaped body 17a).

The first belt-shaped body 16a and the second belt-shaped body 17a respectively have a prescribed width (shown by arrows "$X_1$" and "$X_2$" in FIG. 1A) in the longitudinal direction of the mats and are wound on the circumference of the layered first mat 11 and second mat 12 in the width direction of the mats.

In the following explanation, in the case it is no need to particularly distinguish the first belt-shaped body and the second belt-shaped body, they are simply described as belt-shaped body (belt-shaped bodies).

In the holding sealing material according to the first embodiment of the present invention, the belt-shaped bodies are made of a material having no fixing strength (fixing force).

That is, the belt-shaped bodies and the mats are not fixed to each other. Therefore, the mats are not fixed to one another completely and the mats tend to be shifted in the longitudinal direction.

In the holding sealing material according to the first embodiment of the present invention, the material for the belt-shaped bodies is not particularly limited if it has no fixing strength and examples may include paper, a film, a cloth, and rubber.

Paper forming the belt-shaped bodies may be common paper produced from plant fibers as a raw material and also paper of which the surface is processed by laminating process or the like. The type and the material of paper are not particularly limited.

A film composing the belt-shaped bodies is desirably an organic film but it may be an inorganic film.

The organic film is desirably made of an organic material such as a synthetic resin or the like. Practical examples of the organic film may include a polyethylene film, a polyolefin film, a poly(vinyl chloride) film, a poly(vinyl alcohol) film, a polypropylene film, a polyester film, a polycarbonate film, a polystyrene film, a polyamide film, and a polyimide film.

The inorganic film is desirably made of an inorganic material such as a metal, a ceramic or the like. Practical examples of the inorganic film may include a metal foil of aluminum, copper, iron, silver, gold, and their mixtures, or a ceramic film of alumina, silica, or the like.

Among materials for the belt-shaped bodies, in terms of availability, paper or a film is desirable. Further, among films, an organic film is desirable and a polyethylene film or a polyolefin film is more desirable.

The film may be a film composed of a plurality of these materials.

Rubber composing the belt-shaped bodies is desirably synthetic rubber but it may be natural rubber.

Practical examples of the synthetic rubber may include acrylic rubber, nitrile rubber, styrene-butadiene rubber, butadiene rubber, ethylene-propylene rubber, urethane rubber, or silicone rubber.

Practical examples of a cloth composing the belt-shaped bodies may include a plant fiber cloth, an inorganic fiber cloth, a glass fiber cloth, a nonwoven cloth, and an artificial fiber cloth.

In the holding sealing material 10A shown in FIG. 1A and FIG. 1B, at least one end part of the first belt-shaped body 16a in the longitudinal direction is stuck on the belt-shaped body by an adhesive part 18a. The other end part of the first belt-shaped body 16a in the longitudinal direction is not stuck on the belt-shaped body. Similarly, one end part of the second belt-shaped body 17a in the longitudinal direction is stuck on the belt-shaped body by an adhesive part 19a. The other end part of the second belt-shaped body 17a in the longitudinal direction is not stuck on the belt-shaped body.

The adhesive part 18a of the first belt-shaped body 16a and the adhesive part 19a of the second belt-shaped body 17a are both positioned in the main face of the first mat 11.

The longitudinal direction of the belt-shaped bodies means the direction perpendicular to the width direction of the belt-shaped bodies, and the longitudinal direction of the belt-shaped bodies in FIG. 1A and FIG. 1B is coincident with the width direction of the mats.

The adhesive parts of belt-shaped bodies in a holding sealing material according to the first embodiment of the present invention will be described in detail.

In the following explanation, the configuration of the first belt-shaped body is explained and the similar configuration may be employed also for the second belt-shaped body.

Figure 2:
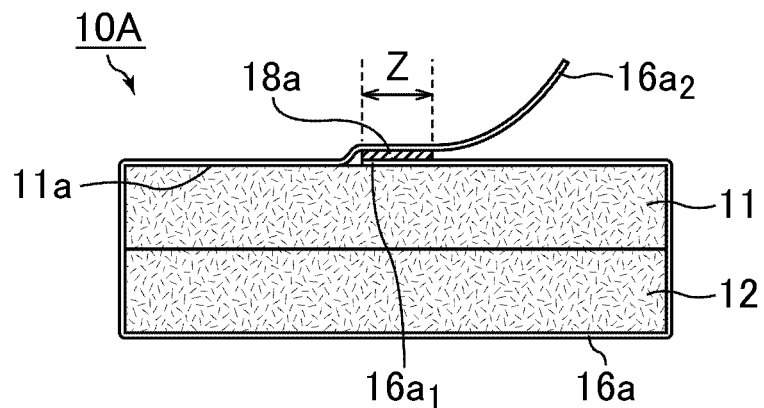
FIG. 2 is a cross-sectional view schematically showing an adhesive part of a first belt-shaped body in the holding sealing material shown in FIG. 1A and FIG. 1B.

FIG. 2 is a cross-sectional view schematically showing the adhesive part of the first belt-shaped body in the holding sealing material shown in FIG. 1A and FIG. 1B.

In the holding sealing material 10A shown in FIG. 2, the first end part $16_{a1}$ of the first belt-shaped body 16a in the longitudinal direction is stuck on the belt-shaped body by an adhesive part 18a. The second end part $16_{a2}$ of the first belt-shaped body 16a in the longitudinal direction is not stuck on the belt-shaped body. The adhesive part 18a is positioned on the main face 11a of the first mat 11, which is one surface of the holding sealing material 10A.

In the holding sealing material according to the first embodiment of the present invention, the configuration of the adhesive part of the belt-shaped bodies is not particularly limited to the configuration shown in FIG. 2 and examples may include configurations shown below.

Figure 3A:
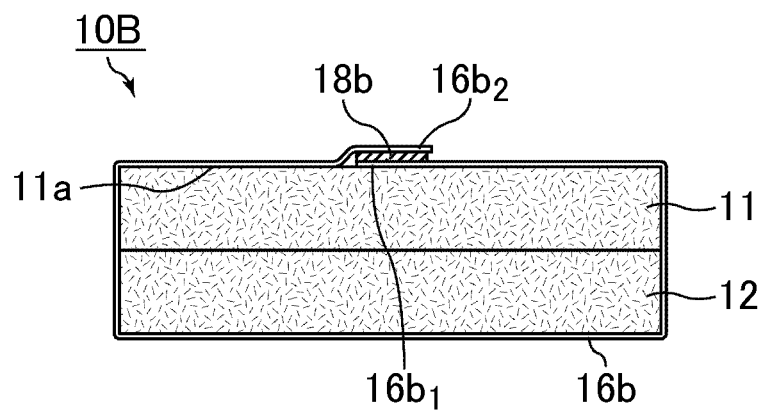
FIG. 3A and FIG. 3B are cross-sectional views schematically showing another example of a holding sealing material according to the first embodiment of the present invention.
Figure 3B:
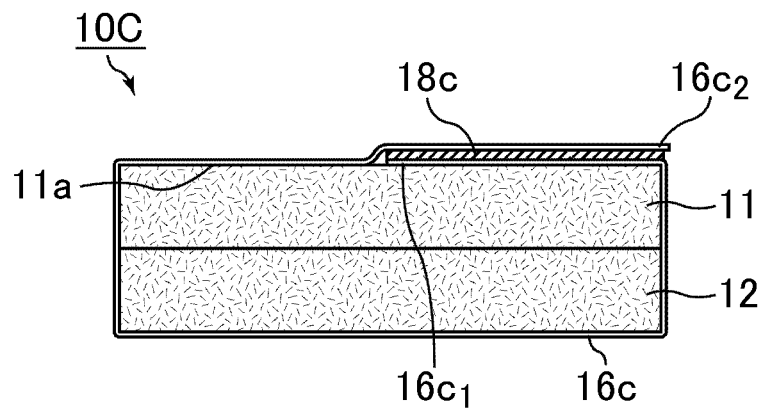

FIG. 3A and FIG. 3B are cross-sectional views schematically showing another example of a holding sealing material according to the first embodiment of the present invention.

In the holding sealing material 10B shown in FIG. 3A, both ends (the first end part $16_{b1}$ and the second end part $16_{b2}$) of the first belt-shaped body 16b in the longitudinal direction are stuck on the belt-shaped body by an adhesive part 18b. The adhesive part 18b is positioned on the main face 11a of the first mat 11, which is one surface of the holding sealing material 10B.

In the holding sealing material 10C shown in FIG. 3B, both ends (the first end part $16_{c1}$ and the second end part $16_{c2}$) of the first belt-shaped body 16c in the longitudinal direction and a portion between the first end part $16_{c1}$ and the second end part $16_{c2}$ are stuck on the belt-shaped body by an adhesive part 18c. The adhesive part 18c is positioned on the main face 11a of the first mat 11, which is one surface of the holding sealing material 10C.

The first belt-shaped body 16b shown in FIG. 3A and the first belt-shaped body 16c shown in FIG. 3B are common in a point that both ends of the belt-shaped bodies are stuck on the belt-shaped bodies, but the size of the adhesive part differs.

In the holding sealing material 10A shown in FIG. 2, the holding sealing material 10B shown in FIG. 3A, and the holding sealing material 10C shown in FIG. 3B, the first end parts of the belt-shaped bodies in the longitudinal direction are all positioned closer to the first mat 11 side than the second end parts of the belt-shaped bodies in the longitudinal direction.

However, in the holding sealing material according to the first embodiment of the present invention, the second end part of the belt-shaped body in the longitudinal direction may be positioned closer to the first mat 11 side than the first end part of the belt-shaped body in the longitudinal direction. In the holding sealing material 10A shown in FIG. 2, the first end part of the first belt-shaped body in the longitudinal direction is stuck on the belt-shaped body by an adhesive part, and the second end part of the first belt-shaped body in the longitudinal direction is not stuck on the belt-shaped body; however, in the holding sealing material according to the first embodiment of the present invention, the second end part of the first belt-shaped body in the longitudinal direction may be stuck on the belt-shaped body by an adhesive part, and the first end part of the first belt-shaped body in the longitudinal direction may not be stuck on the belt-shaped body.

In the holding sealing material according to the first embodiment of the present invention, the adhesive part of the first belt-shaped body may be positioned at any position without any limit if it is positioned on the main face of the first mat, that is, one surface of the holding sealing material.

In the holding sealing material 10A shown in FIG. 1A and FIG. 1B, the adhesive part 18a of the first belt-shaped body 16a and the adhesive part 19a of the second belt-shaped body 17a have substantially the same configuration and are positioned at substantially the same position.

However, in the holding sealing material according to the first embodiment of the present invention, the configurations of the adhesive parts may be different from each other. Further, although the adhesive parts have substantially the same configuration, the positions of the adhesive parts may be different from each other.

In the holding sealing material according to the first embodiment of the present invention, a method for providing the adhesive parts on the belt-shaped bodies is not particularly limited and any method can be employed for forming the adhesive parts by sticking the end parts of the belt-shaped bodies to the belt-shaped bodies.

A method for sticking the belt-shaped bodies may properly be determined corresponding to materials of the belt-shaped bodies, and examples may include a method for sticking by using an adhesive such as glue or an adhesive tape; a method for sticking by using hot melt, ultrasonic, or the like; and a method for sticking by using the heat adhesion of the belt-shaped bodies themselves.

In the holding sealing material according to the first embodiment of the present invention, the number of the belt-shaped bodies is not particularly limited to be two but may be three or more. In the holding sealing material according to the first embodiment of the present invention, in the case the number of belt-shaped bodies is three or more, each belt-shaped body may have an adhesive part and the adhesive part may be positioned at the main face of the first mat. Further, the configurations and positions of the adhesive parts may be substantially the same or different, respectively.

In the holding sealing material according to the first embodiment of the present invention, the width of one belt-shaped body (the length shown by arrows "$X_1$" and "$X_2$" in FIG. 1A) is desirably from about 10 mm to about 100 mm, more desirably from about 20 mm to about 80 mm, and even more desirably from about 30 mm to about 50 mm.

If the width of one belt-shaped body is about 10 mm or more, the belt-shaped body tends not to be torn. On the other hand, if the width of one belt-shaped body is about 100 mm or less, in the case the number of the belt-shaped bodies is high, the surface area of the belt-shaped bodies to the surface area of the holding sealing material is not too wide, and thus the holding force of the holding sealing material tends not to be lowered.

It is supposed that in the case a material composing the belt-shaped bodies is an organic substance such as paper or a film, if the surface area of the belt-shaped bodies becomes small, the organic components of the belt-shaped bodies to be heated and decomposed by the heat of the exhaust gas is decreased when the holding sealing material is used for an exhaust gas purifying apparatus. It is supposed that the heated and decomposed organic components having fluidity then tend not to lower the friction between the mats (holding sealing material) and the casing composing an exhaust gas purifying apparatus or the friction between the mats (holding sealing material) and an exhaust gas treating body, and therefore, the holding force of the holding sealing material tends not to be lowered.

With respect to the holding sealing material according to the first embodiment of the present invention, the distance between the end (first width end portion) of a belt-shaped body nearest to the first end faces (first longitudinal end face) of the mats in the longitudinal direction and the end (second width end portion) of a belt-shaped body nearest to the second end faces (second longitudinal end face) of the mats in the longitudinal direction (the length shown by an arrow "Y" in FIG. 1B) is desirably about 30% or less of the length of the shortest mat in the longitudinal direction and more desirably from about 4% to about 20%.

If the distance in the holding sealing material is about 30% or less, the surface area of the belt-shaped bodies to the surface area of the holding sealing material (mats) is not too wide, and thus the holding force of the holding sealing material tends not to be lowered. As described above, it is because in the case a material composing the belt-shaped bodies is an organic substance such as paper or a film, if the surface area of the belt-shaped bodies becomes small, the organic components of the belt-shaped bodies to be heated and decomposed by the heat of the exhaust gas could supposedly be decreased when the holding sealing material is used for an exhaust gas purifying apparatus.

With respect to the holding sealing material according to the first embodiment of the present invention, the end of a belt-shaped body nearest to the first end faces of the mats in the longitudinal direction and the end of a belt-shaped body nearest to the second end faces of the mats in the longitudinal direction are desirably positioned at positions of from about 5% to about 45% of the whole length of the shortest mat toward the respective end faces of the mats from the bisectioning position of the mats in the longitudinal direction, more desirably from about 8% to about 30%, and even more desirably from about 10% to about 15%.

If the end of a belt-shaped body nearest to the first end faces of the mats in the longitudinal direction and the end of a belt-shaped body nearest to the second end faces of the mats in the longitudinal direction are positioned at positions of about 5% or more of the whole length of the shortest mat toward the respective end faces of the mats from the bisectioning position of the mats in the longitudinal direction, the belt-shaped bodies tend not to be so close to the center of the mats in the longitudinal direction, and thus the effect of preventing the positional deviation of the mats in the width direction is more likely to be obtained sufficiently. On the other hand, if the end of a belt-shaped body nearest to the first end faces of the mats in the longitudinal direction and the end of a belt-shaped body nearest to the second end faces of the mats in the longitudinal direction are positioned at positions of about 45% or less of the whole length of the shortest mat toward the respective end faces of the mats from the bisectioning position of the mats in the longitudinal direction, the belt-shaped bodies tend not to be so close to the end faces of the mats in the longitudinal direction, and thus the belt-shaped bodies tend not to come off the mats.

In the holding sealing material according to the first embodiment of the present invention, the thickness of the belt-shaped bodies is desirably from about 0.008 mm to about 1.5 mm.

If the thickness of the belt-shaped bodies is about 0.008 mm or more, the belt-shaped bodies tend not to be torn and it becomes easier to bundle mats. On the other hand, if the thickness of the belt-shaped bodies is about 1.5 mm or less, the belt-shaped bodies tend not to become an obstacle or to be not hooked on other points in the step of winding the holding sealing material when manufacturing an exhaust gas purifying apparatus. As a result, the production efficiency of the exhaust gas purifying apparatus tends not to be lowered.

In the holding sealing material according to the first embodiment of the present invention, the length of the adhesive part of a belt-shaped body in the width direction of the mats (shown by an arrow "Z" in FIG. 2) is not particularly limited and desirably about 3% or more of the width of the mats and more desirably from about 5% to about 15%.

If the length of the adhesive part of a belt-shaped body in the width direction of the mats is about 3% or more of the width of the mats, the adhesive part is not too small, and thus the end parts of the belt-shaped body tend not to be peeled.

In the holding sealing material according to the first embodiment of the present invention, as shown in FIG. 2, in the case the second end part of a belt-shaped body in the longitudinal direction is not stuck on the belt-shaped body, the length from the second end part to the adhesive part of the belt-shaped body in the longitudinal direction is desirably about 30% or less of the width of the mats and more desirably from about 5% to about 20%.

If the length from the second end part to the adhesive part of the belt-shaped body in the longitudinal direction is about 30% or less of the width of the mats, the belt-shaped body tends not to become an obstacle or tends not to be hooked on other points in the step of winding the holding sealing material when manufacturing an exhaust gas purifying apparatus. As a result, the production efficiency of the exhaust gas purifying apparatus tends not to be lowered.

In the holding sealing material according to the first embodiment of the present invention, it is the same also in the case the first end part of the belt-shaped body in the longitudinal direction is not stuck on the belt-shaped body.

In the holding sealing material according to the first embodiment of the present invention, as shown in FIG. 1A, FIG. 1B and FIG. 2, the adhesive part of a belt-shaped body is desirably formed substantially evenly in the longitudinal direction and in the width direction of the mats. That is, the adhesive part of a belt-shaped body is desirably formed in an approximately rectangular form in a plane view. It is because the end part of a belt-shaped body tends to firmly be stuck.

However, in the holding sealing material according to the first embodiment of the present invention, the plane view shape of the adhesive part of a belt-shaped body is not particularly limited and may be an arbitrary form such as an approximately circular, approximately elliptical, and approximately polygonal forms. Further, the adhesive part of a belt-shaped body may partially have a portion which is not stuck just like a doughnut-like form in a plane view.

One example of a method for manufacturing the holding sealing material according to the first embodiment of the present invention will be described.

At first, a base mat produced by entwining inorganic fibers by a spinning method is punched to prepare base mats with different length.

The base mats with different length are subjected to needling treatment, if necessary, to produce a plurality of mats needed for manufacturing a holding sealing material.

In the base mats, the inorganic fibers are loosely entwined through the spinning process. Execution of the needling treatment for the loosely entwined inorganic fibers entwines the inorganic fibers more complicatedly and thus tends to give mats having an entwined structure enough to keep the shape to a certain extent without a binder.

Herein, the whole length of the shortest mat to be wound on an exhaust gas treating body corresponds to the circumferential length of the exhaust gas treating body and thus the whole length of the shortest mat is determined based on the circumferential length of the exhaust gas treating body. Next, the whole length of a mat which is to be put on the outside of the shortest mat corresponds to the circumferential length of the diameter calculated by adding the thickness of the shortest mat in the case of winding the mat to the diameter of the exhaust gas treating body and thus the whole length of the mat to be put on the outside of the shortest mat is determined by measuring the circumferential length. The procedure is serially repeated to determine each whole length of a plurality of mats to be layered.

Successively, if necessary, a binder is provided on the mats subjected to the needling treatment. Provision of the binder to the mats tends to make the entwined structure of the inorganic fibers firmer, and tends to suppress the bulkiness of the mats.

As the binder, an emulsion prepared by dispersing acrylic latex, rubber type latex, or the like in water can be used. The binder is substantially evenly sprayed to the entire body of a mat by using a spray or the like to provide the binder to the mat.

Thereafter, the mat is dried to remove the water in the binder. The drying condition may be, for example, at about 95° C. to about 150° C. for about 1 minute to about 30 minutes. Mats can be produced through the drying step.

In the first embodiment of the present invention, a plurality of mats with different length are produced and the mats are layered in the order of the length becoming longer or shorter. The number of mats to be layered may be changed in accordance with the holding force or heat insulating capacity which the holding sealing material is required to have. A representative layering procedure is at first layering a mat with the longest length and serially layering mats with shorter whole length as the number of layers is increased more. With respect to the relative position of mats to be layered, a mat with a shorter whole length to be layered may be layered on a mat with a longer whole length while adjusting its position in a manner of preventing both ends of the shorter mat from coming out the longer mat or in a manner that the shorter mat comes out one end of the longer mat by mutually shifting the mats in the longitudinal direction.

Next, a plurality of layered mats are bundled by a belt-shaped body.

For example, a method to be employed may be a method involving preparing a long tape having substantially a constant width and made of paper and repeating steps of winding the tape around the circumference of a plurality of mats, thereafter cutting the tape, and sticking at least one end part of the tape on the tape a number of times same as the number of the belt-shaped bodies. A method of sticking the tape may be, as described above, a method for sticking by using an adhesive such as glue or an adhesive tape; a method for sticking by using hot melt, ultrasonic, or the like; and a method for sticking by using the heat adhesion of the belt-shaped bodies themselves.

The holding sealing material according to the first embodiment of the present invention can be produced according to the above-mentioned method.

Next, an exhaust gas purifying apparatus according to the first embodiment of the present invention using the holding sealing material according to the first embodiment of the present invention will be described.

Figure 4A:
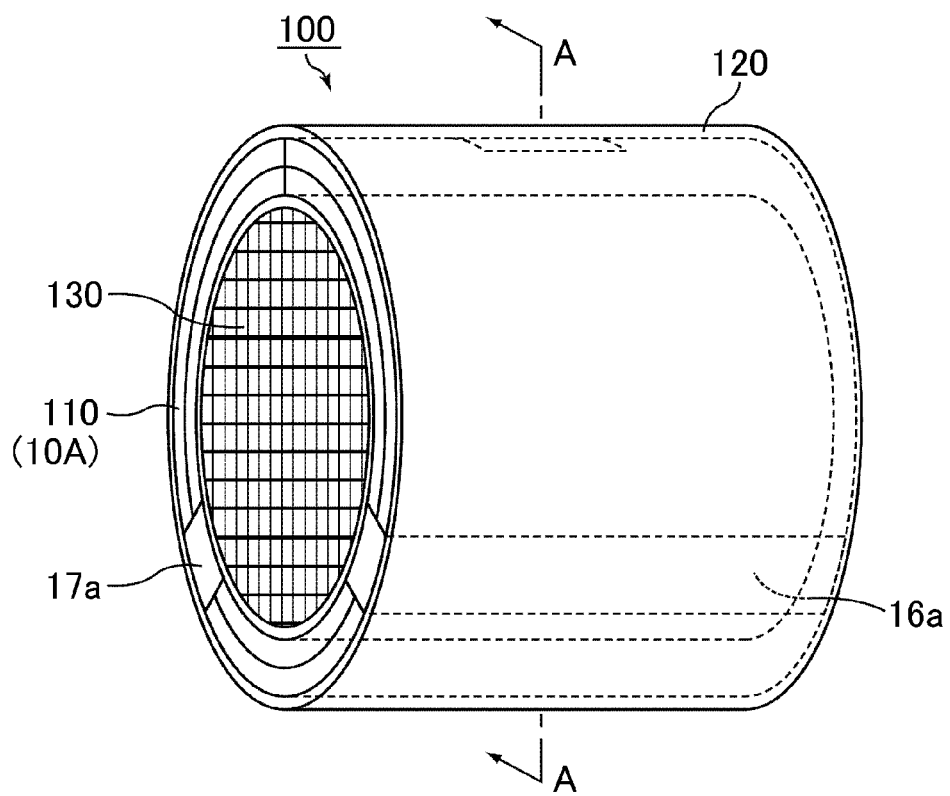
FIG. 4A is a perspective view schematically showing one example of an exhaust gas purifying apparatus according to the first embodiment of the present invention.
Figure 4B:
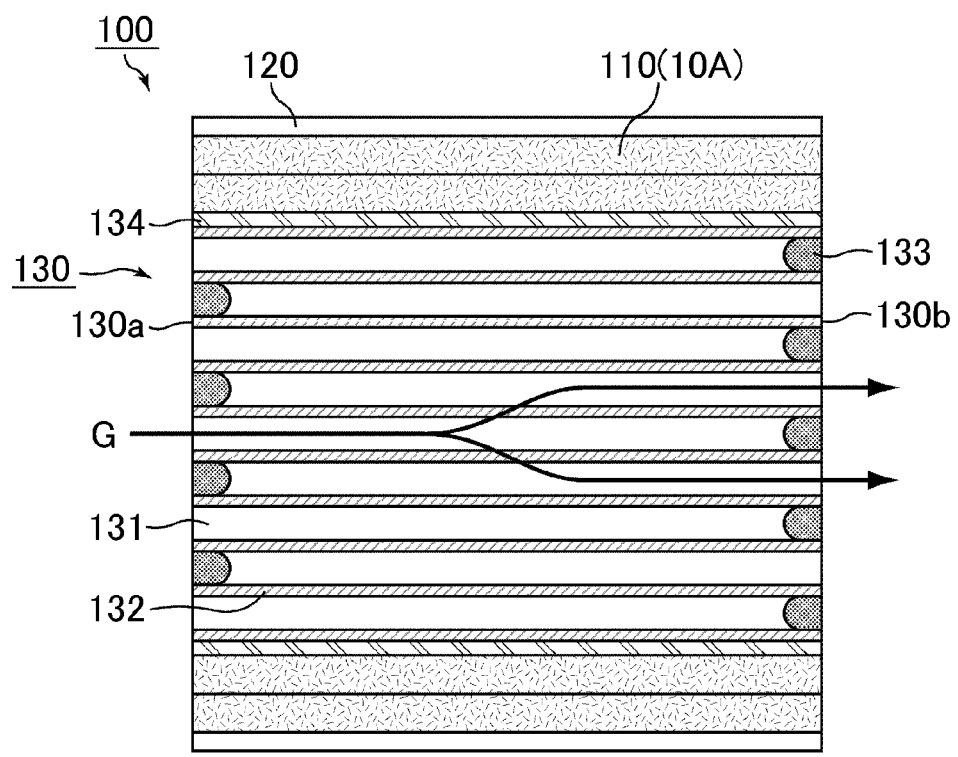
FIG. 4B is a A-A line cross-sectional view of the exhaust gas purifying apparatus shown in FIG. 4A.

FIG. 4A is a perspective view schematically showing one example of an exhaust gas purifying apparatus according to the first embodiment of the present invention, and FIG. 4B is a A-A line cross-sectional view of the exhaust gas purifying apparatus shown in FIG. 4A.

As shown in FIG. 4A and FIG. 4B, the exhaust gas purifying apparatus 100 according to the first embodiment of the present invention is composed of a pillar-shaped exhaust gas treating body 130 having a large number of cells 131 longitudinally disposed in parallel with one another with cell walls 132 therebetween, a casing 120 for housing the exhaust gas treating body 130, and a holding sealing material 110 which is provided between the exhaust gas treating body 130 and the casing 120 and which holds the exhaust gas treating body 130.

Based on the necessity, an introduction pipe for introducing exhaust gas emitted out of an internal combustion engine and a discharge pipe for discharging the exhaust gas passed through the exhaust gas purifying apparatus outside may be connected to the end parts of the casing 120.

Additionally, in the exhaust gas purifying apparatus 100 shown in FIG. 4A and FIG. 4B, a honeycomb filter in which either one end of the respective cells are sealed with a plug material 133 is used as the exhaust gas treating body 130, as shown in FIG. 4B.

In the exhaust gas purifying apparatus 100 shown in FIG. 4A and FIG. 4B, the holding sealing material 10A shown in FIG. 1A, FIG. 1B and FIG. 2 is used as the holding sealing material 110.

In the exhaust gas purifying apparatus according to the first embodiment of the present invention, an arbitrary holding sealing material according to the first embodiment of the present invention may be used as the holding sealing material.

Hereinafter, the case that exhaust gas passes through the exhaust gas purifying apparatus 100 having the above-mentioned configuration will be described along with FIG. 4B.

As shown in FIG. 4B, the exhaust gas discharged out of an internal combustion engine and flowing in the exhaust gas purifying apparatus 100 (exhaust gas is shown as "G" and the flow of the exhaust gas is shown by an arrow in FIG. 4B) flows in one cells 131 opened in the end face 130a in the exhaust gas flow-in side of the exhaust gas treating body (honeycomb filter) 130 and passes through the cell walls 132 partitioning the cells 131. At that time, PM in the exhaust gas is collected by the cell walls 132 to purify the exhaust gas. The purified exhaust gas flows out of the other cells 131 opened in the end face 130b in the exhaust gas flow-out side and is discharged outside.

Next, the exhaust gas treating body (honeycomb filter) and the casing composing the exhaust gas purifying apparatus 100 shown in FIG. 4A and FIG. 4B will be described.

The configuration of the holding sealing material 110 is already explained as the holding sealing material according to the first embodiment of the present invention and therefore the explanation will be omitted.

At first, the exhaust gas treating body composing the exhaust gas purifying apparatus will be described.

Figure 5:
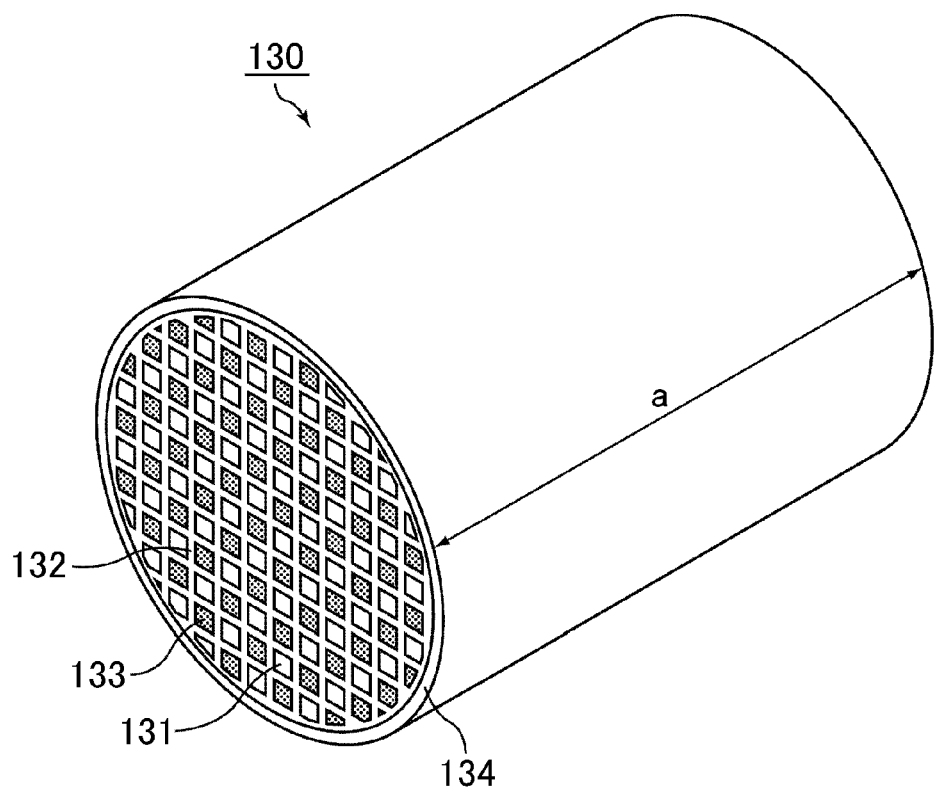
FIG. 5 is a perspective view schematically showing one example of an exhaust gas treating body composing the exhaust gas purifying apparatus according to the first embodiment of the present invention.

FIG. 5 is a perspective view schematically showing one example of the exhaust gas treating body composing the exhaust gas purifying apparatus according to the first embodiment of the present invention.

As shown in FIG. 5, the exhaust gas treating body (honeycomb filter) 130 is made of mainly a porous ceramic and its shape is approximately round pillar-shaped. A periphery coating layer 134 is formed on the periphery of the honeycomb filter 130, aiming to reinforce the periphery of the honeycomb filter 130, adjust the form, and improve the heat insulation property of the honeycomb filter 130.

The configuration of the inside of the honeycomb filter 130 is the same as already described above in the explanation of the exhaust gas purifying apparatus according to the first embodiment of the present invention (see FIG. 4B).

Next, the casing composing the exhaust gas purifying apparatus will be described.

Figure 6:
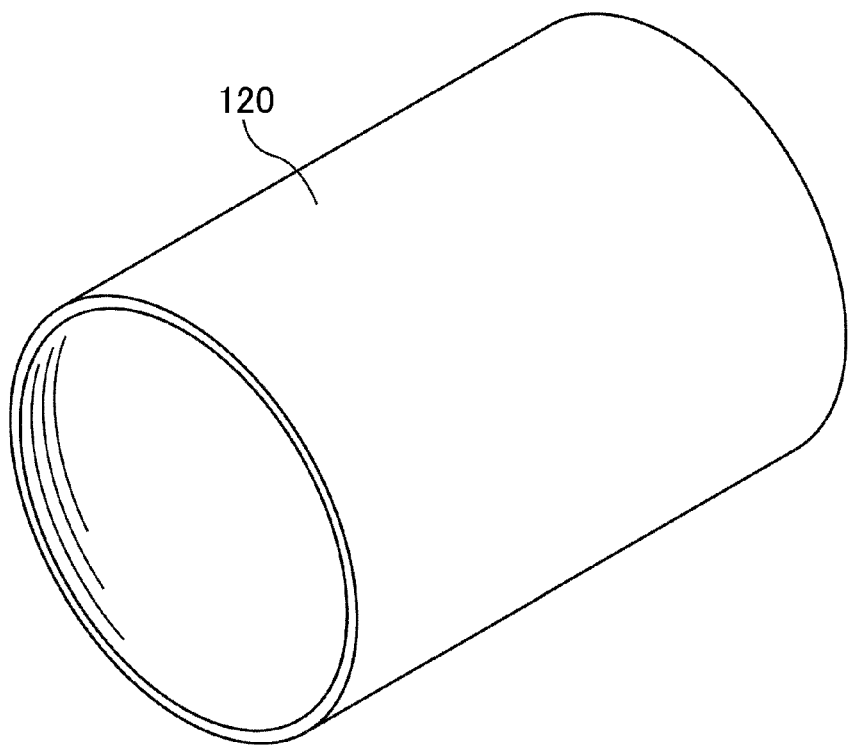
FIG. 6 is a perspective view schematically showing one example of a casing composing the exhaust gas purifying apparatus according to the first embodiment of the present invention.

FIG. 6 is a perspective view schematically showing one example of the casing composing the exhaust gas purifying apparatus according to the first embodiment of the present invention.

The casing 120 shown in FIG. 6 is made of mainly a metal such as a stainless steel and its shape is approximately cylindrical. The inner diameter of the casing is made slightly shorter than the total length of the diameter of the end faces of the honeycomb filter 130 and the thickness of the holding sealing material 10A in the state of being wound on the honeycomb filter 130, and the length of the casing is almost the same as the length of the honeycomb filter 130 in the longitudinal direction (the direction shown by an arrow "a" in FIG. 5).

Successively, a method for manufacturing the exhaust gas purifying apparatus according to the first embodiment of the present invention will be described.

Figure 7A:
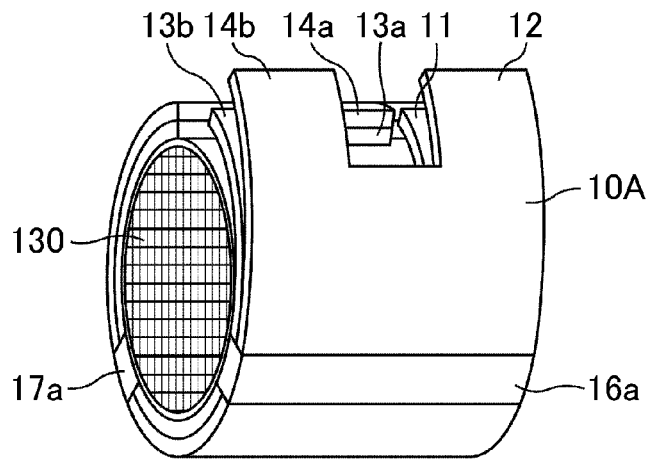
FIG. 7A, FIG. 7B and FIG. 7C are perspective views schematically showing one example of a method for manufacturing the exhaust gas purifying apparatus according to the first embodiment of the present invention.
Figure 7B:
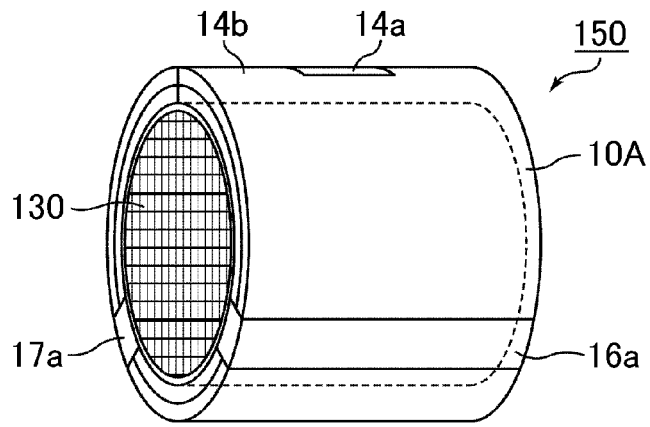
Figure 7C:
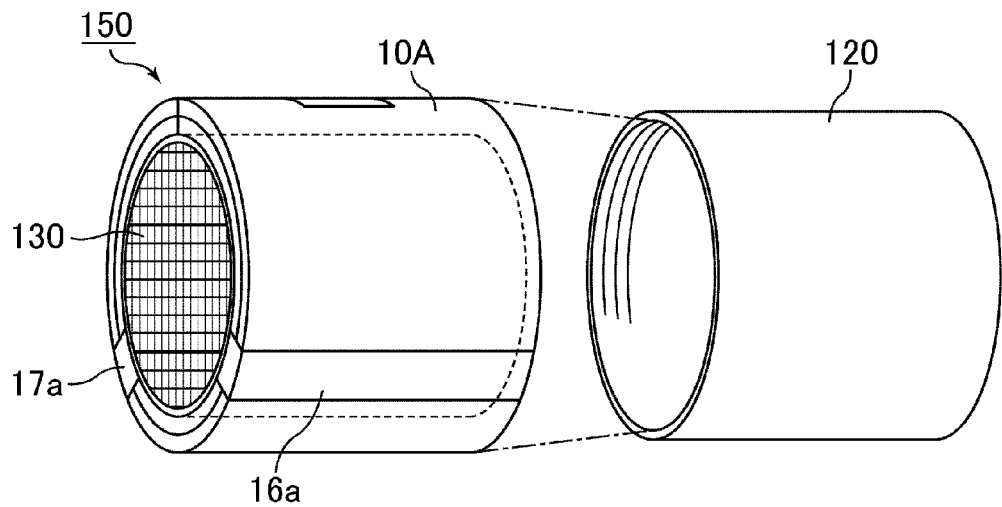

FIG. 7A, FIG. 7B and FIG. 7C are perspective views schematically showing one example of a method for manufacturing the exhaust gas purifying apparatus according to the first embodiment of the present invention.

In the FIG. 7A, FIG. 7B and FIG. 7C, a method for manufacturing the exhaust gas purifying apparatus 100 shown in FIG. 4A and FIG. 4B will be described as one example of a method for manufacturing an exhaust gas purifying apparatus according to the first embodiment of the present invention.

At first, as shown in FIG. 7A and FIG. 7B, the holding sealing material 10A shown in FIG. 1A, FIG. 1B and FIG. 2 is wound on the circumference of the exhaust gas treating body (honeycomb filter) 130 to produce a wound body (the exhaust gas treating body wound with the holding sealing material) 150 (winding step).

In the winding step, the holding sealing material 10A produced in the above-mentioned processes is wound on the outer circumference of an approximately round pillar-shaped exhaust gas treating body 130 produced by a conventionally known method in a manner that the projected portions 13a and the recessed portions 13b are fitted and the projected portions 14a and the recessed portions 14b are fitted.

In this case, as shown in FIG. 7A, the holding sealing material 10A is wound on the circumference of the exhaust gas treating body 130 in a manner that the main face of the mat on which the adhesion part 18a of the first belt-shaped body 16a and the adhesion part 19a of the second belt-shaped body 17a of the holding sealing material 10A are positioned; that is, the main face of the first mat 11; is brought into contact with the exhaust gas treating body 130 (the adhesion part 18a of the first belt-shaped body 16a and the adhesion part 19a of the second belt-shaped body 17a are not illustrated in FIG. 7A).

As a result, the wound body 150 shown in FIG. 7B can be produced.

Next, as shown in FIG. 7C, the produced wound body 150 is housed in the casing 120 made of mainly a metal and having an approximately cylindrical form with a prescribed size (housing step).

In order to compress the sealing material and make the sealing material exhibit a prescribed repulsive force (that is, the force for holding the exhaust gas treating body) after the housing, the inner diameter of the casing 120 is made to be slightly smaller than the outermost diameter including the thickness of the holding sealing material 10A of the exhaust gas treating body 130 wound with the holding sealing material 10A.

The exhaust gas purifying apparatus 100 shown in FIG. 4A and FIG. 4B can be manufactured by the above-mentioned method.

In the housing step, examples of a method for housing the wound body in the casing may include a stuffing method, a sizing method (a swaging method), and a clamshell method.

The stuffing method is for stuffing the wound body to a prescribed position in the inside of the casing by using a stuffing tool or the like. The sizing method (a swaging method) is for inserting the wound body in the casing and thereafter compacting the casing from the outer circumference side so as to narrow the inner diameter of the casing. The clamshell method is for making the casing have a form separable into two parts, a first casing and a second casing, setting the wound body on the first casing, and then putting the second casing on and sealing them.

Among these methods for housing the wound body in the casing, the stuffing method or the sizing method (the swaging method) is desirable. It is because it is unnecessary for the stuffing method and the sizing method (the swaging method) to use two parts as the casing, and the number of manufacturing processes tends to be lessened.

In the method for manufacturing the exhaust gas purifying apparatus according to the first embodiment of the present invention, a removing step of removing the belt-shaped body composing the holding sealing material may be carried out after the winding step and before the housing step.

For example, if the positioning of the holding sealing material and the exhaust gas treating body is fixed using an adhesive tape after the holding sealing material is wound on the circumference of the exhaust gas treating body, the belt-shaped body becomes unnecessary. Therefore, the belt-shaped body tends to be removed by using a cutting tool such as a pair of scissors, a cutter, or the like.

In the case a material composing the belt-shaped bodies is an organic substance such as paper or a film, the amount of the organic components of the belt-shaped bodies to be heated and decomposed by the heat of the exhaust gas is more likely to be decreased at the time of using the exhaust gas purifying apparatus by removing the belt-shaped body.

As described above, in the method for manufacturing the exhaust gas purifying apparatus according to the first embodiment of the present invention, the belt-shaped body may remain or may not remain in the exhaust gas purifying apparatus after manufacture.

Hereinafter, the effects of the holding sealing material, the exhaust gas purifying apparatus, and the method for manufacturing an exhaust gas purifying apparatus according to the first embodiment of the present invention will be listed up.

(1) With respect to the holding sealing material of the present embodiment, a plurality of mats are bundled by a belt-shaped body having no fixing force. Consequently, since the mats are not fixed to one another, the mats tend to be shifted in the longitudinal direction at the time of winding the mats on the circumference of an exhaust gas treating body. Therefore, even in the case the positioning of the mats is deviated, relative positioning among the mats tends to be adjusted finely at the time of winding the holding sealing material on the circumference of the exhaust gas treating body. As a result, the end faces of mats (end faces of the mats in the longitudinal direction side) tend to be fitted without any gap.

(2) With respect to the holding sealing material of the present embodiment, a plurality of mats are bundled by a belt-shaped body having substantially a constant width to the length of the mats (the length in the longitudinal direction of the mats). Consequently, positional deviation of the mats in the width direction tends to be prevented.

(3) With respect to the holding sealing material of the present embodiment, a belt-shaped body having no fixing force is used. Therefore, unlike the case of fixing a plurality of mats with an adhesive tape or the like, the use amount of an organic component tends to be saved.

(4) With respect to the holding sealing material of the present embodiment, even if layering of a plurality of mats is failed, the layering tends to be done again by removing the belt-shaped body by cutting or the like, and a problem of damaging the mats tends not to be accompanied. On the other hand, with respect to a conventional holding sealing material described in JP-A 2007-218221, in the case layering of a plurality of mats is failed, since perforations remain in the mats, it becomes difficult to reuse the mats. As described above, in the case of the holding sealing material of the present embodiment, wasting of materials necessary for producing the holding sealing material is more likely to be suppressed.

(5) With respect to the holding sealing material of the present embodiment, a plurality of mats are bundled by two or more of the belt-shaped bodies.

When a plurality of mats are fixed at two or more points, the positional deviation of the mats in the width direction tends to be prevented better. It is because fixed ends exist in at least one end part side in observation of both end parts of the holding sealing material from the respective belt-shaped bodies and the degree of freedom of the positional deviation of the mats in the width direction tends to be considerably limited.

(6) With respect to the holding sealing material of the present embodiment, at least one end of a belt-shaped body in the longitudinal direction is stuck on the belt-shaped body by an adhesive part.

For example, along tape having substantially constant width is prepared, and then the tape is cut after wound on the circumference of a plurality of mats and at least one end of the tape is stuck to the tape, making it easier to manufacture the belt-shaped body. Consequently, a belt-shaped body corresponding to the number (thickness) of mats to be bundled is more likely to be manufactured.

(7) With respect to the exhaust gas purifying apparatus and the method for manufacturing an exhaust gas purifying apparatus of the present embodiment, since the holding sealing material of the present embodiment is used as the holding sealing material, the holding sealing material tends to be wound on the circumference of the exhaust gas treating body without any gap. Consequently, leakage of exhaust gas and deterioration of durability of the exhaust gas purifying apparatus tends to be prevented.

(8) With respect to the exhaust gas purifying apparatus and the method for manufacturing an exhaust gas purifying apparatus of the present embodiment, at least one end of a belt-shaped body composing the holding sealing material in the longitudinal direction is stuck on the belt-shaped body by an adhesive part and positioned on the main face of the mat in the side to be brought into contact with the exhaust gas treating body.

When the adhesive part of the belt-shaped body is positioned on the main face of the mat in the side to be brought into contact with the exhaust gas treating body, at the time of housing the exhaust gas treating body wound with the holding sealing material in the casing, the adhesive part tends not to be hooked on the casing and therefore, the exhaust gas treating body wound with the holding sealing material tends to be housed in the casing.

Second Embodiment

Hereinafter, the second embodiment which is one embodiment of a holding sealing material, an exhaust gas purifying apparatus, and a method for manufacturing an exhaust gas purifying apparatus of the present invention will be described.

At first, a holding sealing material according to the second embodiment of the present invention will be described.

The holding sealing material according to the second embodiment of the present invention is obtained by layering a plurality of mats including inorganic fibers and bundling the plurality of mats with two or more belt-shaped bodies having no fixing force. At least one end part of the belt-shaped bodies composing the holding sealing material in the longitudinal direction is stuck on the belt-shaped bodies by an adhesive part. The adhesive part of the belt-shaped bodies is positioned on the main face of the mat opposed to the side to be brought into contact with the exhaust gas treating body in the case an exhaust gas purifying apparatus is manufactured using the holding sealing material.

Figure 8A:
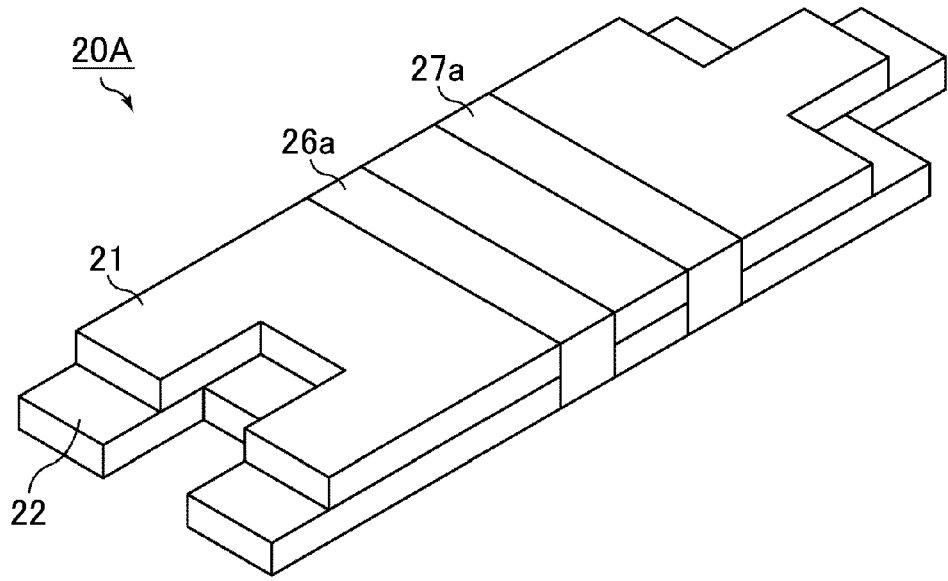
FIG. 8A and FIG. 8B are perspective views schematically showing one example of a holding sealing material according to a second embodiment of the present invention.
Figure 8B:
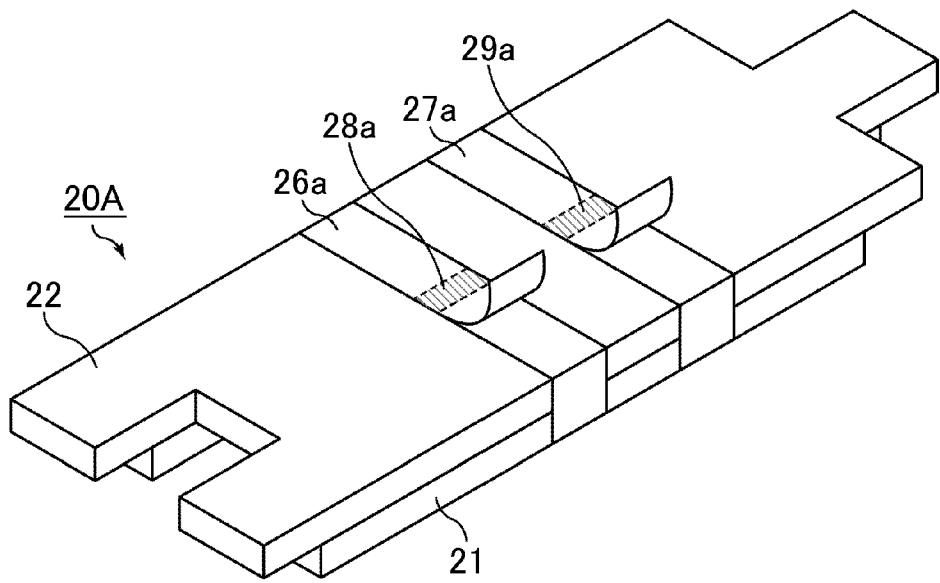

FIG. 8A and FIG. 8B are perspective views schematically showing one example of the holding sealing material according to the second embodiment of the present invention. FIG. 8A is a perspective view of the holding sealing material observed from a first mat side, and FIG. 8B is a perspective view of the holding sealing material observed from a second mat side.

In the holding sealing material 20A shown in FIG. 8A and FIG. 8B, the first mat 21 and the second mat 22 are bundled with two belt-shaped bodies (a first belt-shaped body 26a and a second belt-shaped body 27a).

In the holding sealing material 20A shown in FIG. 8A and FIG. 8B, one end part of the first belt-shaped body 26a in the longitudinal direction is stuck on the belt-shaped body by an adhesive part 28a. The other end part of the first belt-shaped body 26a in the longitudinal direction is not stuck on the belt-shaped body. Similarly, one end part of the second belt-shaped body 27a in the longitudinal direction is stuck on the belt-shaped body by an adhesive part 29a. The other end part of the second belt-shaped body 27a in the longitudinal direction is not stuck on the belt-shaped body.

The adhesive part 28a of the first belt-shaped body 26a and the adhesive part 29a of the second belt-shaped body 27a are both positioned on the main face of the second mat 22.

In the holding sealing material according to the second embodiment of the present invention, only the positions of the adhesive parts of the belt-shaped bodies are different from those in the holding sealing material according to the first embodiment of the present invention.

Therefore, the configurations of the adhesive parts of the belt-shaped bodies may be similar to the configurations represented by those shown in FIG. 2 and FIG. 3A and FIG. 3B and described for the holding sealing material according to the first embodiment of the present invention.

In the holding sealing material according to the second embodiment of the present invention, as shown in FIG. 8B, in the case one end part of the belt-shaped body in the longitudinal direction is not stuck on the belt-shaped body, the length from the one end part to the adhesive part of the belt-shaped body in the longitudinal direction is desirably from about 5% to about 20% of the width of the mats.

With respect to the holding sealing material according to the second embodiment of the present invention, in the case one end part of the belt-shaped body in the longitudinal direction is not stuck on the belt-shaped body, the belt-shaped body tends to be peeled after the holding sealing material is wound on the circumference of the exhaust gas treating body.

If the length from one end part to the adhesive part of the belt-shaped body in the longitudinal direction is about 5% or more of the width of the mats, the belt-shaped body tends to be peeled after the holding sealing material is wound on the circumference of the exhaust gas treating body. On the other hand, if the length from one end part to the adhesive part of the belt-shaped body in the longitudinal direction is about 20% or less of the width of the mats, the belt-shaped body tends not to be an obstacle or tends not to be hooked on other points in the step of winding the holding sealing material when manufacturing an exhaust gas purifying apparatus. As a result, the production efficiency of the exhaust gas purifying apparatus tends not to be lowered.

In addition, in the case the belt-shaped body is not removed after the holding sealing material is wound on the circumference of the exhaust gas treating body, there is no problem even if both ends of the belt-shaped body are stuck to the adhesive part.

In the holding sealing material according to the second embodiment of the present invention, it is the same also in the case the other end part of the belt-shaped body in the longitudinal direction is not stuck on the belt-shaped body.

Other configurations of the holding sealing material according to the second embodiment of the present invention are similar to those of the holding sealing material according to the first embodiment of the present invention and therefore, the explanation of them will be omitted.

Next, an exhaust gas purifying apparatus according to the second embodiment of the present invention using the holding sealing material according to the second embodiment of the present invention will be described.

FIG. 9 is a perspective view schematically showing one example of the exhaust gas purifying apparatus according to the second embodiment of the present invention.

As shown in FIG. 9, the exhaust gas purifying apparatus 200 according to the second embodiment of the present invention is composed of an exhaust gas treating body (honeycomb filter) 230, a casing 220 for housing the exhaust gas treating body 230, and a holding sealing material 210 which is provided between the exhaust gas treating body 230 and the casing 220 and which holds the exhaust gas treating body 230.

In the exhaust gas purifying apparatus 200 shown in FIG. 9, the holding sealing material 20A shown in FIG. 8A and FIG. 8B is used as the holding sealing material 210.

In the exhaust gas purifying apparatus according to the second embodiment of the present invention, an arbitrary holding sealing material according to the second embodiment of the present invention can be used as the holding sealing material.

Other configurations of the exhaust gas purifying apparatus according to the second embodiment of the present invention are similar to those of the exhaust gas purifying apparatus according to the first embodiment of the present invention and therefore, the explanation of them will be omitted.

Successively, a method for manufacturing the exhaust gas purifying apparatus according to the second embodiment of the present invention will be described.

Figure 10A:
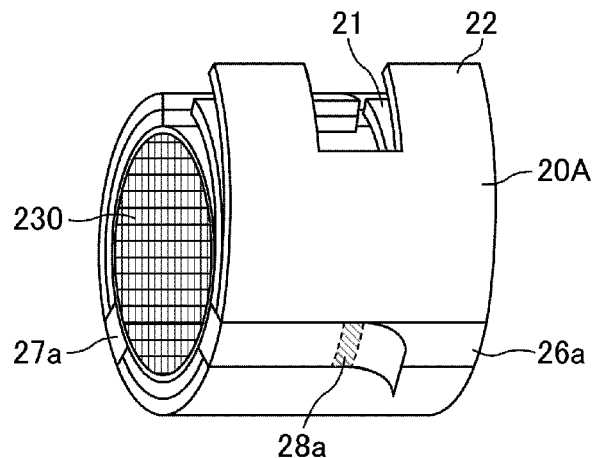
FIG. 10A, FIG. 10B and FIG. 10C are perspective views schematically showing one example of a method for manufacturing the exhaust gas purifying apparatus according to the second embodiment of the present invention.
Figure 10B:
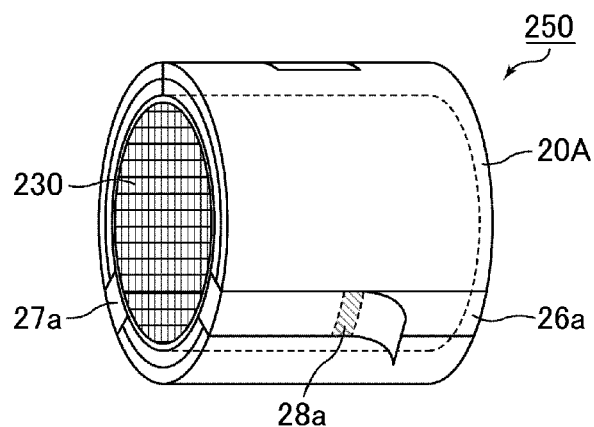
Figure 10C:
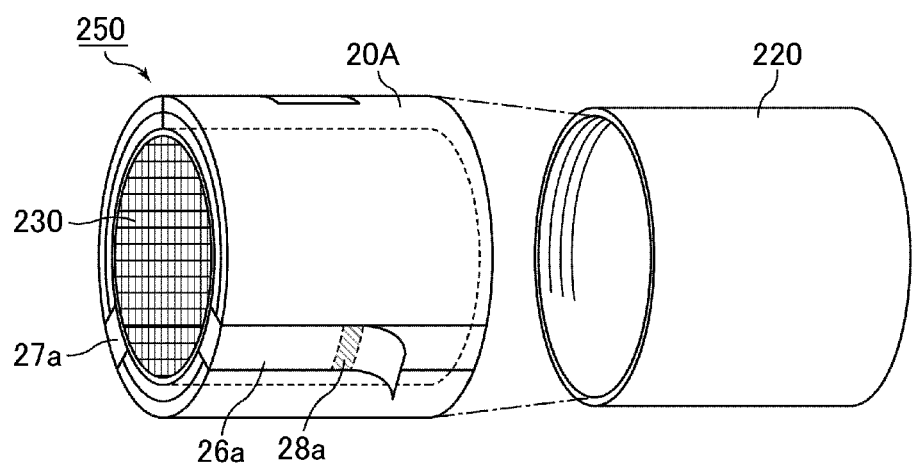

FIG. 10A, FIG. 10B and FIG. 10C are perspective views schematically showing one example of a method for manufacturing the exhaust gas purifying apparatus according to the second embodiment of the present invention.

With reference to FIG. 10A, FIG. 10B and FIG. 10C, a method for manufacturing the exhaust gas purifying apparatus 200 shown in FIG. 9 will be described as one example of the method for manufacturing an exhaust gas purifying apparatus according to the second embodiment of the present invention.

At first, as shown in FIG. 10A and FIG. 10B, the holding sealing material 20A shown in FIG. 8A and FIG. 8B is wound on the circumference of the exhaust gas treating body (honeycomb filter) 230 to produce a wound body (the exhaust gas treating body wound with the holding sealing material) 250 (winding step).

In this case, as shown in FIG. 10A, the holding sealing material 20A is wound on the circumference of the exhaust gas treating body 230 in a manner that the main face of the mat in the opposed side in which the adhesion part 28a of the first belt-shaped body 26a and the adhesion part 29a of the second belt-shaped body 27a of the holding sealing material 20A are positioned; that is, the main face of the first mat 21; is brought into contact with the exhaust gas treating body 230 (the adhesion part 29a of the second belt-shaped body 27a is not illustrated in FIG. 10A).

As a result, the wound body 250 shown in FIG. 10B can be produced.

Next, as shown in FIG. 10C, the produced wound body 250 is housed in the casing 220 made of mainly a metal and having an approximately cylindrical form with a prescribed size (housing step).

The exhaust gas purifying apparatus 200 shown in FIG. 9 can be manufactured by the above-mentioned method.

In the method for manufacturing the exhaust gas purifying apparatus according to the second embodiment of the present invention, a removing step of removing the belt-shaped body composing the holding sealing material may be carried out after the winding step and before the housing step.

In the method for manufacturing the exhaust gas purifying apparatus according to the second embodiment of the present invention, the adhesive part of the belt-shaped body is positioned on the most outer mat of the holding sealing material. Therefore, the belt-shaped body tends to be removed by peeling the adhesive part. Further, if one end part of the belt-shaped body in the longitudinal direction is not stuck on the belt-shaped body, the belt-shaped body tends to be removed from the end part which is not stuck.

No need to say, the belt-shaped body may be removed by using a cutting tool such as a pair of scissors, a cutter, or the like.

As described above, in the method for manufacturing the exhaust gas purifying apparatus according to the second embodiment of the present invention, the belt-shaped body may remain or may not remain in the exhaust gas purifying apparatus after manufacture.

The method for manufacturing an exhaust gas purifying apparatus according to the second embodiment of the present invention is similar to the method for manufacturing an exhaust gas purifying apparatus according to the first embodiment of the present invention, except the above-mentioned point and therefore, its detailed explanation will be omitted.

The second embodiment of the present invention can cause the effects (1) to (7) described in the first embodiment of the present invention and also the following effect.

(9) With respect to the exhaust gas purifying apparatus and the method for manufacturing an exhaust gas purifying apparatus of the present embodiment, at least one end of a belt-shaped body in the longitudinal direction composing the holding sealing material is stuck on the belt-shaped body by an adhesive part, and the adhesive part of the belt-shaped body is positioned on the main face of the mat in the side opposed to the side to be brought into contact with the exhaust gas treating body.

When the adhesive part of the belt-shaped body is positioned on the main face of a mat in the opposed side to the side to be brought into contact with the exhaust gas treating body, the belt-shaped body tends to be removed by peeling the adhesive part with no need of using a tool such as a pair of scissors.

Third Embodiment

Hereinafter, the third embodiment which is one embodiment of a holding sealing material, an exhaust gas purifying apparatus, and a method for manufacturing an exhaust gas purifying apparatus of the present invention will be described.

At first, a holding sealing material according to the third embodiment of the present invention will be described.

The holding sealing material according to the third embodiment of the present invention is obtained by layering a plurality of mats including inorganic fibers and bundling the plurality of mats with two or more belt-shaped bodies having no fixing force. At least one end part of the belt-shaped bodies composing the holding sealing material in the longitudinal direction is stuck on the belt-shaped bodies by an adhesive part. The adhesive part of the belt-shaped bodies is positioned on the first end face (first width end face) or the second end face (second width end face) of at least one of the mats in the width direction.

Figure 11:
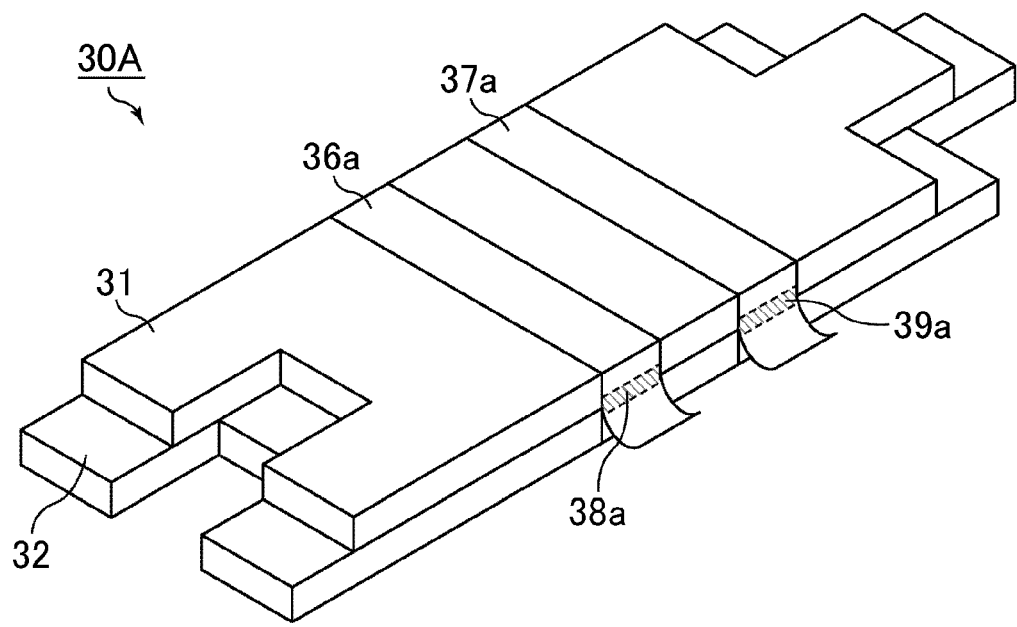
FIG. 11 is a perspective view schematically showing one example of a holding sealing material according to a third embodiment of the present invention.

FIG. 11 is a perspective view schematically showing one example of the holding sealing material according to the third embodiment of the present invention.

In the holding sealing material 30A shown in FIG. 11, the first mat 31 and the second mat 32 are bundled with two belt-shaped bodies (a first belt-shaped body 36a and a second belt-shaped body 37a).

In the holding sealing material 30A shown in FIG. 11, one end part of the first belt-shaped body 36a in the longitudinal direction is stuck on the belt-shaped body by an adhesive part 38a. The other end part of the first belt-shaped body 36a in the longitudinal direction is not stuck on the belt-shaped body. Similarly, one end part of the second belt-shaped body 37a in the longitudinal direction is stuck on the belt-shaped body by an adhesive part 39a. The other end part of the second belt-shaped body 37a in the longitudinal direction is not stuck on the belt-shaped body.

The adhesive part 38a of the first belt-shaped body 36a and the adhesive part 39a of the second belt-shaped body 37a are both positioned on the first end face of the mat in the width direction.

The adhesive parts of belt-shaped bodies in a holding sealing material according to the third embodiment of the present invention will be described in detail.

In the following explanation, the configuration of the first belt-shaped body is explained and the similar configuration may be employed also for the second belt-shaped body.

Figure 12:
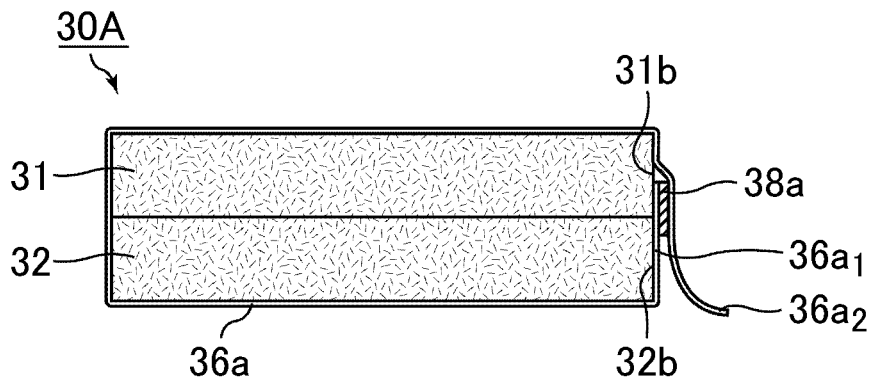
FIG. 12 is a cross-sectional view schematically showing an adhesive part of a first belt-shaped body in the holding sealing material shown in FIG. 11.

FIG. 12 is a cross-sectional view schematically showing an adhesive part of the first belt-shaped body in the holding sealing material shown in FIG. 11.

In the holding sealing material 30A shown in FIG. 12, a first end part $36_{a1}$ of the first belt-shaped body 36a in the longitudinal direction is stuck on the belt-shaped body by an adhesive part 38a. The second end part $36_{a2}$ of the first belt-shaped body 36a in the longitudinal direction is not stuck on the belt-shaped body. The adhesive part 38a is positioned on the first end faces of the mats in the width direction; that is, one side face of the holding sealing material 30A (the first end face 31b of the first mat 31 in the width direction and the first end face 32b of the second mat 32 in the width direction).

In the holding sealing material according to the third embodiment of the present invention, the configuration of the adhesive part of the belt-shaped bodies is not particularly limited to the configuration shown in FIG. 12 and examples may include configurations shown below.

Figure 13A:
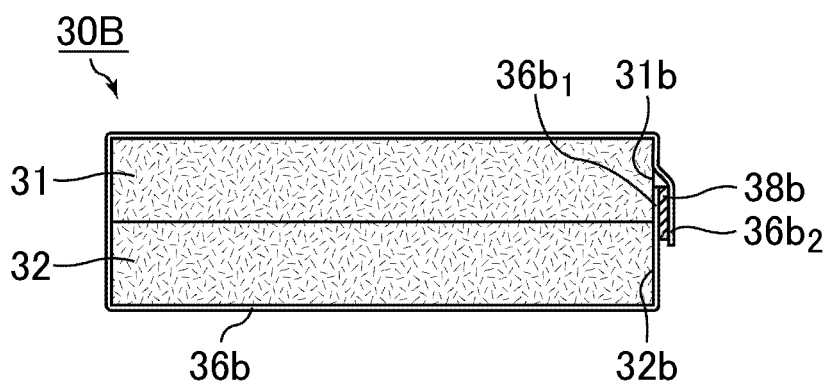
FIG. 13A and FIG. 13B are cross-sectional views schematically showing another example of a holding sealing material according to the third embodiment of the present invention.
Figure 13B:
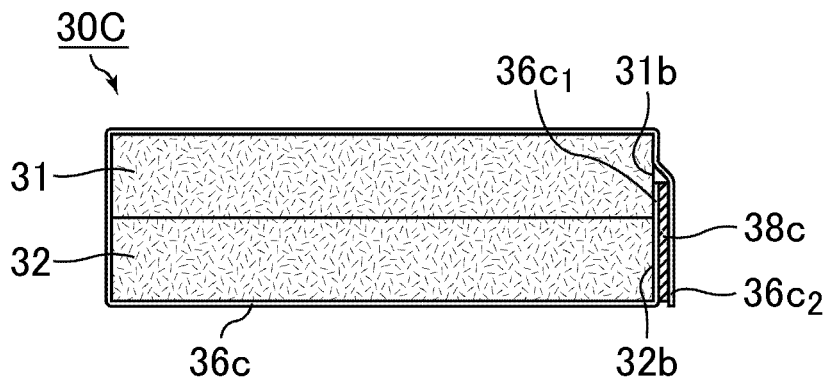

FIG. 13A and FIG. 13B are cross-sectional views schematically showing another example of a holding sealing material according to the third embodiment of the present invention.

In the holding sealing material 30B shown in FIG. 13A, both ends (the first end part $36_{b1}$ and the second end part $36_{b2}$) of the first belt-shaped body 36b in the longitudinal direction are stuck on the belt-shaped body by an adhesive part 38b. The adhesive part 38b is positioned on the first end faces of the mats in the width direction; that is, one side face of the holding sealing material 30B (the first end face 31b of the first mat 31 in the width direction and the first end face 32b of the second mat 32 in the width direction).

In the holding sealing material 30C shown in FIG. 13B, both ends (the first end part $36_{c2}$ and the second end part $36_{c2}$) of the first belt-shaped body 36c in the longitudinal direction and a portion between the first end part $36_{c2}$ and the second end part $36_{c2}$ are stuck on the belt-shaped body by an adhesive part 38c. The adhesive part 38c is positioned on the first end faces of the mats in the width direction; that is, one side face of the holding sealing material 30C (the first end face 31b of the first mat 31 in the width direction and the first end face 32b of the second mat 32 in the width direction).

The first belt-shaped body 36b shown in FIG. 13A and the first belt-shaped body 36c shown in FIG. 13B are common in a point that both ends of the belt-shaped bodies are stuck on the belt-shaped bodies, but the size of the adhesive part differs.

In the holding sealing material 30A shown in FIG. 12, the holding sealing material 30B shown in FIG. 13A, and the holding sealing material 30C shown in FIG. 13B, the first end parts of the belt-shaped bodies in the longitudinal direction are all positioned closer to the first mat 31 side and the second mat 32 side than the second end parts of the belt-shaped bodies in the longitudinal direction.

However, in the holding sealing material according to the third embodiment of the present invention, the second end part of the belt-shaped body in the longitudinal direction may be positioned closer to the first mat 31 side and the second mat 32 side than the first end part of the belt-shaped body in the longitudinal direction. In the holding sealing material 30A shown in FIG. 12, the first end part of the first belt-shaped body in the longitudinal direction is stuck on the belt-shaped body by an adhesive part, and the second end part of the first belt-shaped body in the longitudinal direction is not stuck on the belt-shaped body; however, in the holding sealing material according to the third embodiment of the present invention, the second end part of the first belt-shaped body in the longitudinal direction may be stuck on the belt-shaped body by an adhesive part, and the first end part of the first belt-shaped body in the longitudinal direction may not be stuck on the belt-shaped body.

In the holding sealing material according to the third embodiment of the present invention, the adhesive part of the first belt-shaped body may be positioned not on the first end face of the mat in the width direction; that is, one side face of the holding sealing material but on the second end face opposed to the first end face of the mat in the width direction.

In the holding sealing material according to the third embodiment of the present invention, the adhesive part of the first belt-shaped body may be positioned at any position without any particular limit if it is positioned on the first end face or the second end face of the mat in the width direction.

In the holding sealing material 30A shown in FIG. 11, the adhesive part 38a of the first belt-shaped body 36a and the adhesive part 39a of the second belt-shaped body 37a have substantially the same configuration and are positioned at substantially the same position.

However, in the holding sealing material according to the third embodiment of the present invention, the configurations of the adhesive parts may be different from each other. Further, although the adhesive parts have substantially the same configuration, the positions of the adhesive parts may be different from each other. Further, a belt-shaped body having the adhesive part positioned on the first end face of the mat in the width direction and a belt-shaped body having the adhesive part positioned on the second end face of the mat in the width direction may coexist.

In the holding sealing material according to the third embodiment of the present invention, as shown in FIG. 12, in the case one end part of the belt-shaped body in the longitudinal direction is not stuck on the belt-shaped body, the length from the one end part to the adhesive part of the belt-shaped body in the longitudinal direction is desirably from about 5% to about 10% of the width of the mats.

With respect to the holding sealing material according to the third embodiment of the present invention, in the case one end part of the belt-shaped body in the longitudinal direction is not stuck on the belt-shaped body, the belt-shaped body tends to be peeled after the holding sealing material is wound on the circumference of the exhaust gas treating body.

If the length from one end part to the adhesive part of the belt-shaped body in the longitudinal direction is about 5% or more of the width of the mats, the belt-shaped body tends to be peeled after the holding sealing material is wound on the circumference of the exhaust gas treating body. On the other hand, if the length from one end part to the adhesive part of the belt-shaped body in the longitudinal direction of about 10% or less of the width of the mats, the belt-shaped body tends not to become an obstacle or tends not to be hooked on other points in the step of winding the holding sealing material when manufacturing an exhaust gas purifying apparatus. As a result, the production efficiency of the exhaust gas purifying apparatus tends not to be lowered.

In addition, in the case the belt-shaped body is not removed after the holding sealing material is wound on the circumference of the exhaust gas treating body, there is no problem even if both ends of the belt-shaped body are stuck to the adhesive part.

In the holding sealing material according to the third embodiment of the present invention, it is the same also in the case the other end part of the belt-shaped body in the longitudinal direction is not stuck on the belt-shaped body.

Other configurations of the holding sealing material according to the third embodiment of the present invention are similar to those of the holding sealing material according to the first embodiment of the present invention and therefore, the explanation of them will be omitted.

Next, an exhaust gas purifying apparatus according to the third embodiment of the present invention using the holding sealing material according to the third embodiment of the present invention will be described.

Figure 14:
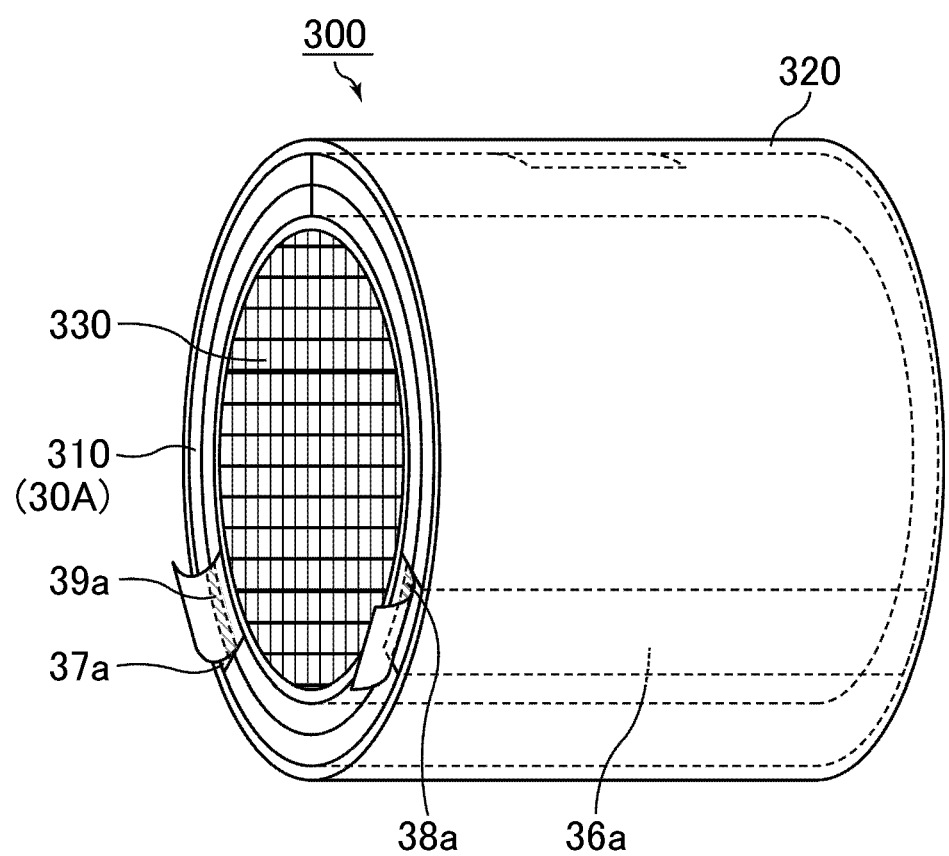
FIG. 14 is a perspective view schematically showing one example of the exhaust gas purifying apparatus according to a third embodiment of the present invention.

FIG. 14 is a perspective view schematically showing one example of the exhaust gas purifying apparatus according to a third embodiment of the present invention.

As shown in FIG. 14, the exhaust gas purifying apparatus 300 according to the third embodiment of the present invention is composed of an exhaust gas treating body (honeycomb filter) 330, a casing 320 for housing the exhaust gas treating body 330, and a holding sealing material 310 which is provided between the exhaust gas treating body 330 and the casing 320 and which holds the exhaust gas treating body 330.

In the exhaust gas purifying apparatus 300 shown in FIG. 14, the holding sealing material 30A shown in FIG. 11 and FIG. 12 is used as the holding sealing material 310.

With respect to the exhaust gas purifying apparatus according to the third embodiment of the present invention, an arbitrary holding sealing material according to the third embodiment of the present invention can be used as the holding sealing material.

Other configurations of the exhaust gas purifying apparatus according to the third embodiment of the present invention are similar to those of the exhaust gas purifying apparatus according to the first embodiment of the present invention and therefore, the explanation of them will be omitted.

Successively, a method for manufacturing the exhaust gas purifying apparatus according to the third embodiment of the present invention will be described.

Figure 15A:
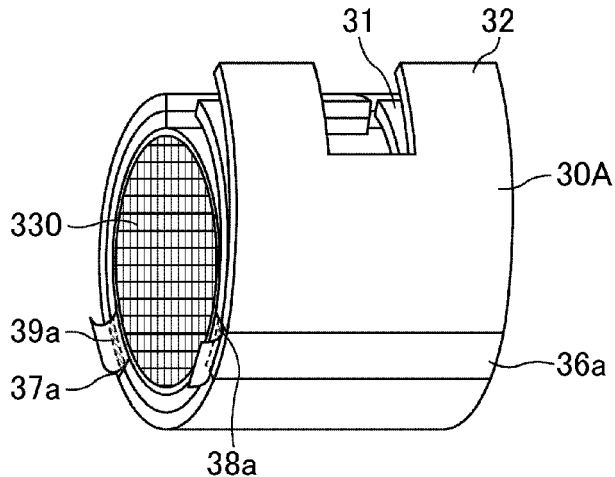
FIG. 15A, FIG. 15B, and FIG. 15C are perspective views schematically showing one example of a method for manufacturing the exhaust gas purifying apparatus according to the third embodiment of the present invention.
Figure 15B:
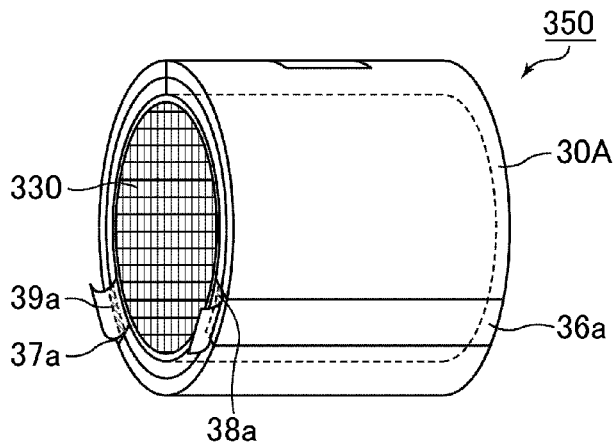
Figure 15C:
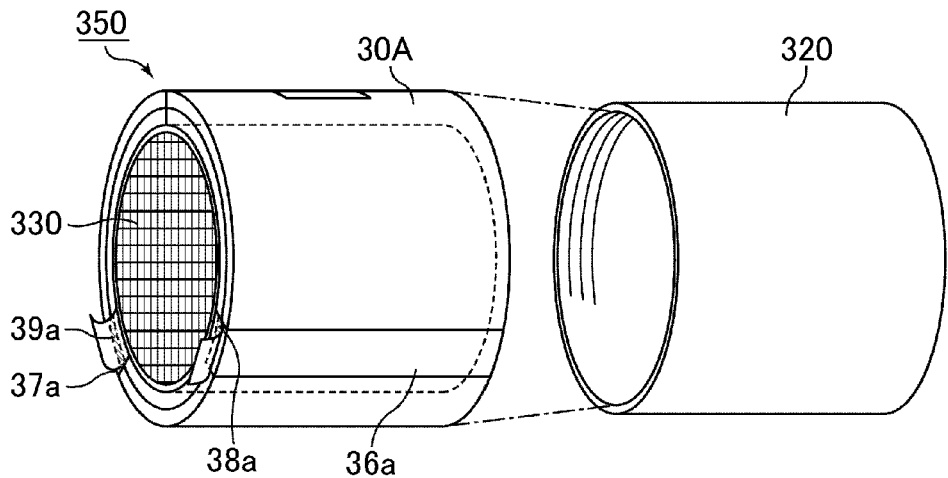

FIG. 15A, FIG. 15B and FIG. 15C are perspective views schematically showing one example of a method for manufacturing the exhaust gas purifying apparatus according to the third embodiment of the present invention.

With reference to FIG. 15A, FIG. 15B and FIG. 15C, a method for manufacturing the exhaust gas purifying apparatus 300 shown in FIG. 14 will be described as one example of the method for manufacturing an exhaust gas purifying apparatus according to the third embodiment of the present invention.

At first, as shown in FIG. 15A and FIG. 15B, the holding sealing material 30A shown in FIG. 11 and FIG. 12 is wound on the circumference of the exhaust gas treating body (honeycomb filter) 330 to produce a wound body (the exhaust gas treating body wound with the holding sealing material) 350 (winding step).

In this case, as shown in FIG. 15A, the holding sealing material 30A is wound on the circumference of the exhaust gas treating body 330 in a manner that the main face of the first mat 31 of the holding sealing material 30A is brought into contact with the exhaust gas treating body 330.

As a result, the wound body 350 shown in FIG. 15B can be produced.

Next, as shown in FIG. 15C, the produced wound body 350 is housed in the casing 320 made of mainly a metal and having an approximately cylindrical form with a prescribed size (housing step).

The exhaust gas purifying apparatus 300 shown in FIG. 14 can be manufactured by the above-mentioned method.

In the method for manufacturing the exhaust gas purifying apparatus according to the third embodiment of the present invention, a removing step of removing the belt-shaped body composing the holding sealing material may be carried out after the winding step and before the housing step.

In the method for manufacturing the exhaust gas purifying apparatus according to the third embodiment of the present invention, the adhesive part of the belt-shaped body is positioned on the first end face or the second end face of the mat in the width direction. Therefore, the belt-shaped body tends to be removed by peeling the adhesive part. Further, if one end part of the belt-shaped body in the longitudinal direction is not stuck on the belt-shaped body, the belt-shaped body tends to be removed from the end part which is not stuck.

No need to say, the belt-shaped body may be removed by using a cutting tool such as a pair of scissors, a cutter, or the like.

As described above, in the method for manufacturing the exhaust gas purifying apparatus according to the third embodiment of the present invention, the belt-shaped body may remain or may not remain in the exhaust gas purifying apparatus after manufacture.

The method for manufacturing an exhaust gas purifying apparatus according to the third embodiment of the present invention is similar to the method for manufacturing an exhaust gas purifying apparatus according to the first embodiment of the present invention, except the above-mentioned point and therefore, its detailed explanation will be omitted.

The third embodiment of the present invention can cause the effects (1) to (7) described in the first embodiment of the present invention and also the following effect.

(10) With respect to the method for manufacturing an exhaust gas purifying apparatus of the present embodiment, at least one end part of the belt-shaped body composing the holding sealing material in the longitudinal direction is stuck on the belt-shaped body by an adhesive part, and the adhesive part of the belt-shaped body is positioned on the first end face or the second end face of at least one of the mats in the width direction side. Therefore, the belt-shaped body tends to be removed by peeling the adhesive part.

Fourth Embodiment

Hereinafter, the fourth embodiment which is one embodiment of a holding sealing material, an exhaust gas purifying apparatus, and a method for manufacturing an exhaust gas purifying apparatus of the present invention will be described.

At first, a holding sealing material according to the fourth embodiment of the present invention will be described.

The holding sealing material according to the fourth embodiment of the present invention is obtained by layering a plurality of mats including inorganic fibers and bundling the plurality of mats with one belt-shaped body having no fixing force.

The holding sealing material according to the fourth embodiment of the present invention has the similar configuration to that of the holding sealing material according to any of the first to the third embodiments of the present invention, except the above-mentioned point.

Figure 16:
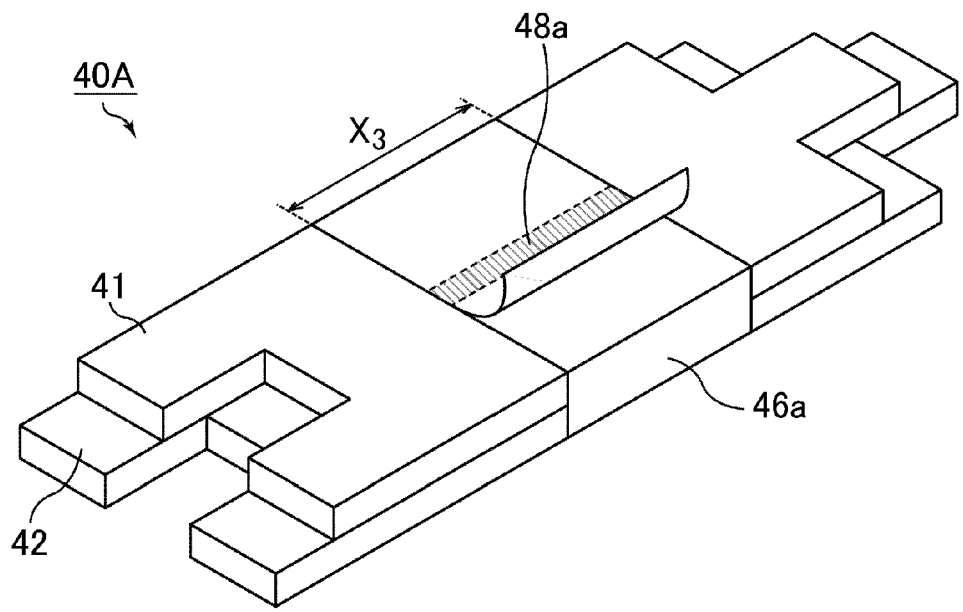
FIG. 16 is a perspective view schematically showing one example of a holding sealing material according to a fourth embodiment of the present invention.

FIG. 16 is a perspective view schematically showing one example of the holding sealing material according to the fourth embodiment of the present invention.

In the holding sealing material 40A shown in FIG. 16, the first mat 41 and the second mat 42 are bundled with one belt-shaped body 46a.

In the holding sealing material 40A shown in FIG. 16, one end part of the belt-shaped body 46a in the longitudinal direction is stuck on the belt-shaped body by an adhesive part 48a. The other end part of the belt-shaped body 46a in the longitudinal direction is not stuck on the belt-shaped body. The adhesive part 48a of the belt-shaped body 46a is positioned on the main face of the first mat 41.

With respect to the holding sealing material according to the fourth embodiment of the present invention, since the number of the belt-shaped body is one, "the distance between the end of a belt-shaped body nearest to the first end faces of the mats in the longitudinal direction and the end of a belt-shaped body nearest to the second end faces of the mats in the longitudinal direction" are coincident with the width of one belt-shaped body (the length shown by an arrow "$X_3$" in FIG. 16).

In the holding sealing material according to the fourth embodiment of the present invention, the width of one belt-shaped body is desirably from about 10 mm to about 100 mm, more desirably from about 20 mm to about 80 mm, and even more desirably from about 30 mm to about 50 mm.

If the width of one belt-shaped body is about 10 mm or more, the width for fixing a plurality of mats is not too narrow, and thus a sufficient effect of preventing the positional deviation of the mats in the width direction is more likely to be obtained. On the other hand, if the width of one belt-shaped body is about 100 mm or less, the surface area of the belt-shaped body to the surface area of the holding sealing material is not too wide, and thus the holding force of the holding sealing material tends not to be lowered.

The holding sealing material according to the fourth embodiment of the present invention is different from the holding sealing materials according to the first to the third embodiments in a point that the number of the belt-shaped body is one.

Other configurations of the holding sealing material according to the fourth embodiment of the present invention are similar to that of the holding sealing material according to any of the first to the third embodiments of the present invention. Therefore, the explanation of them will be omitted.

The exhaust gas purifying apparatus according to the fourth embodiment of the present invention has the similar configuration to that of the exhaust gas purifying apparatuses according to any of the first to the third embodiments of the present invention, except that the holding sealing material according to the fourth embodiment of the present invention is used. Therefore, the explanation of them will be omitted.

The method for manufacturing the exhaust gas purifying apparatus according to the fourth embodiment of the present invention has the similar configuration to that of the method for manufacturing an exhaust gas purifying apparatus according to any of the first to the third embodiments of the present invention, except that the holding sealing material according to the fourth embodiment of the present invention is used. Therefore, the explanation of them will be omitted.

The fourth embodiment of the present invention can cause the effects (1) to (4) and (6) to (10) described in the first to the third embodiments of the present invention.

Fifth Embodiment

Hereinafter, the fifth embodiment which is one embodiment of a holding sealing material, an exhaust gas purifying apparatus, and a method for manufacturing an exhaust gas purifying apparatus of the present invention will be described.

At first, a holding sealing material according to the fifth embodiment of the present invention will be described.

In the holding sealing material according to the fifth embodiment of the present invention, groove parts so formed as to fix the belt-shaped body are formed in first end faces and second end faces of the mats in the width direction.

The holding sealing material according to the fifth embodiment of the present invention has the similar configuration to that of the holding sealing material according to any of the first to the fourth embodiments of the present invention, except the above-mentioned point.

Figure 17:
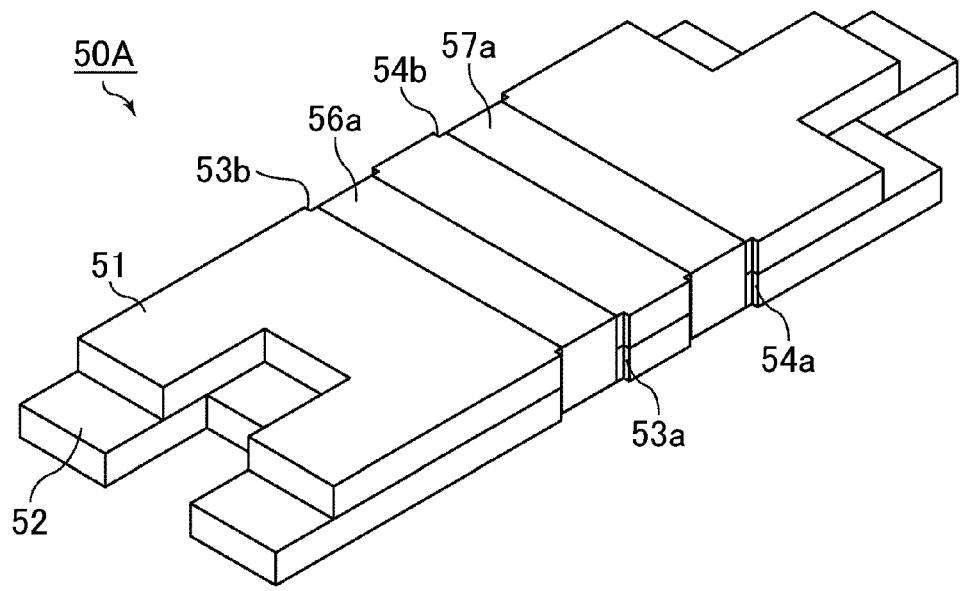
FIG. 17 is a perspective view schematically showing one example of a holding sealing material according to a fifth embodiment of the present invention.

FIG. 17 is a perspective view schematically showing one example of the holding sealing material according to the fifth embodiment of the present invention.

In the holding sealing material 50A shown in FIG. 17, the first mat 51 and the second mat 52 are bundled with two belt-shaped bodies (a first belt-shaped body 56a and a second belt-shaped body 57a).

In the holding sealing material 50A shown in FIG. 17, a groove part 53a is so formed as to fix (engage) the first belt-shaped body 56a and a groove part 54a is so formed as to fix (engage) the second belt-shaped body 57a in the first end faces of the mats in the width direction. Similarly, a groove part 53b is so formed as to fix (engage) the first belt-shaped body 56a and a groove part 54b is so formed as to fix (engage) the second belt-shaped body 57a in the second end faces of the mats in the width direction.

In the holding sealing material according to the fifth embodiment of the present invention, the width (the length in the longitudinal direction of the mats) of the groove parts so formed as to fix the belt-shaped body may be substantially the same as the width of the belt-shaped body and is desirably longer than the width of the belt-shaped body. In this case, since there is a gap between the belt-shaped body and the groove part, the mats tend to be shifted in the longitudinal direction of the mats.

Practically, the width of the groove parts so formed as to fix the belt-shaped body is preferably from about 101% to about 110% of the width of the belt-shaped body.

If the width of the groove parts is about 101% or more of the belt-shaped body, the gap between the belt-shaped body and the groove part is not too narrow, and thus the mats are more likely to be shifted in the longitudinal direction. As a result, the end faces of the mats tend not to be deviated in the case the holding sealing material is wound on the circumference of an exhaust gas treating body. On the other hand, if the width of the groove parts is about 110% or less of the belt-shaped body, the effective area of the mats tends not to be decreased and therefore, the holding force of the holding sealing material is less likely to be deteriorated.

In the holding sealing material according to the fifth embodiment of the present invention, the depth (the length in the width direction of the mats) of the groove parts so formed as to fix the belt-shaped body is desirably from about 0.1 mm to about 5 mm and more desirably from about 0.2 mm to about 2 mm.

If the depth of the groove parts is about 0.1 mm or more, the effect of forming the groove parts tends to be obtained efficiently. On the other hand, if the depth of the groove parts is about 5 mm or less, the belt-shaped body bits the mats not too much, and therefore, the mats are less likely to be shifted in the longitudinal direction.

The holding sealing material according to the fifth embodiment of the present invention is different from the holding sealing materials according to the first to the fourth embodiments of the present invention in a point that the groove parts are so formed as to fix the belt-shaped body.

Other configurations of the holding sealing material according to the fifth embodiment of the present invention are similar to that of the holding sealing material according to any of the first to the fourth embodiments of the present invention. Therefore, the explanation of them will be omitted.

To produce the holding sealing material according to the fifth embodiment of the present invention, a mat punched into a prescribed form in which the groove parts are formed may be used, or the groove parts may be formed by grinding the end faces of the mats to be used for any of the holding sealing material according to the first to the fourth embodiments of the present invention.

Use of the above-mentioned mats makes it possible to produce the holding sealing material according to the fifth embodiment of the present invention.

The exhaust gas purifying apparatus according to the fifth embodiment of the present invention has the similar configuration to that of the exhaust gas purifying apparatus according to any of the first to the fourth embodiments of the present invention, except that the holding sealing material according to the fifth embodiment of the present invention is used. Therefore, the explanation of them will be omitted.

The method for manufacturing the exhaust gas purifying apparatus according to the fifth embodiment of the present invention has the similar configuration to that of the method for manufacturing the exhaust gas purifying apparatus according to any of the first to the fourth embodiments of the present invention, except that the holding sealing material according to the fifth embodiment of the present invention is used. Therefore, the explanation of them will be omitted.

The fifth embodiment of the present invention can cause the effects (1) to (10) described in the first to the third embodiments of the present invention and also the following effect.

(11) With respect to the holding sealing material of the present embodiment, groove parts are so formed as to fix the belt-shaped body in first end faces and second end faces of the mats in the width direction.

When groove parts are formed in end faces of the mats in the width direction, the position of the belt-shaped body tends to be fixed by the groove parts, and positional deviation of the mats in the width direction tends to be further prevented.

Sixth Embodiment

Hereinafter, the sixth embodiment which is one embodiment of a holding sealing material, an exhaust gas purifying apparatus, and a method for manufacturing an exhaust gas purifying apparatus of the present invention will be described.

At first, a holding sealing material according to the sixth embodiment of the present invention will be described.

In the holding sealing material according to the sixth embodiment of the present invention, at least one of printing and coloring for displaying identification data of the mats is done on the belt-shaped body.

The holding sealing material according to the sixth embodiment of the present invention has the similar configuration to that of the holding sealing material according to any of the first to the fifth embodiments of the present invention, except the above-mentioned point.

Figure 18:
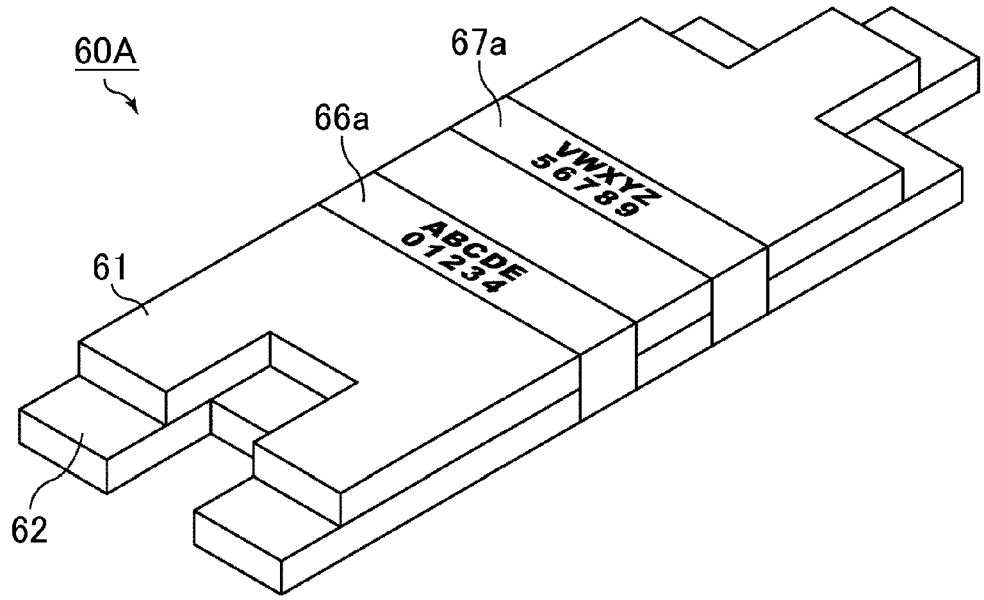
FIG. 18 is a perspective view schematically showing one example of a holding sealing material according to a sixth embodiment of the present invention.

FIG. 18 is a perspective view schematically showing one example of the holding sealing material according to the sixth embodiment of the present invention.

In the holding sealing material 60A shown in FIG. 18, the first mat 61 and the second mat 62 are bundled with two belt-shaped bodies (a first belt-shaped body 66a and a second belt-shaped body 67a).

In the holding sealing material 60A shown in FIG. 18, printing is done on the first belt-shaped body 66a and the second belt-shaped body 67a for showing the identification data of the mats. That is, the holding sealing material 60A is provided with data by letters.

The data by letters may be data relevant to the number of lots, the name of products, production date, etc. and the types of the data are not particularly limited. The data of the front and rear face of the holding sealing material may also be expressed by letters.

The color of the printing is not particularly limited and may include red, blue, yellow, green, and black colors. The color of the printing may be all substantially the same or different depending on the data.

In the holding sealing material 60A shown in FIG. 18, printing is done on a portion of the belt-shaped body positioned on the main face of the first mat 61 for displaying the identification data of the mats.

However, in the holding sealing material according to the sixth embodiment of the present invention, the position where printing is done is not particularly limited if the printing of identification data of the mats is done on the belt-shaped body.

Figure 19:
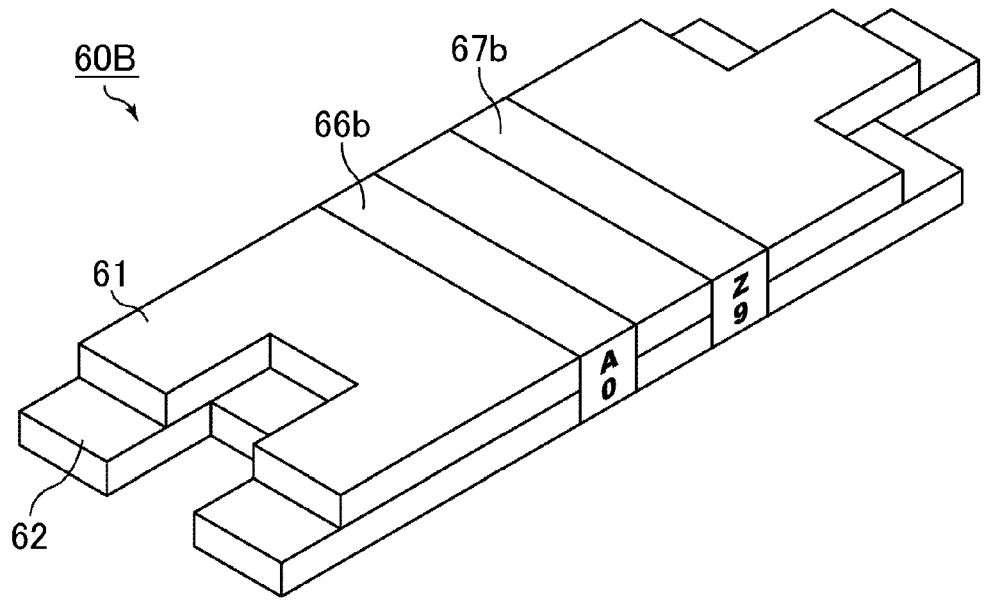
FIG. 19 is a perspective view schematically showing another example of a holding sealing material according to the sixth embodiment of the present invention.

FIG. 19 is a perspective view schematically showing another example of the holding sealing material according to the sixth embodiment of the present invention.

In the holding sealing material 60B shown in FIG. 19, printing is done on a portion of the belt-shaped body positioned on the first end face of a mat for displaying the identification data of the mats.

In the holding sealing material according to the sixth embodiment of the present invention, the identification data of mats to be printed on the belt-shaped body is not limited to the data by letters and may be data by one dimensional codes and data by two dimensional codes.

Examples of the one dimensional codes may be bar codes.
Examples of the two dimensional codes may be QR codes.
The data by two dimensional codes may be data of such as the number of lots, the name of products, production history, raw materials, etc. and the types of the data are not particularly limited.

The data by letters and at least one of one dimensional codes and two dimensional codes may coexist.

Figure 20A:
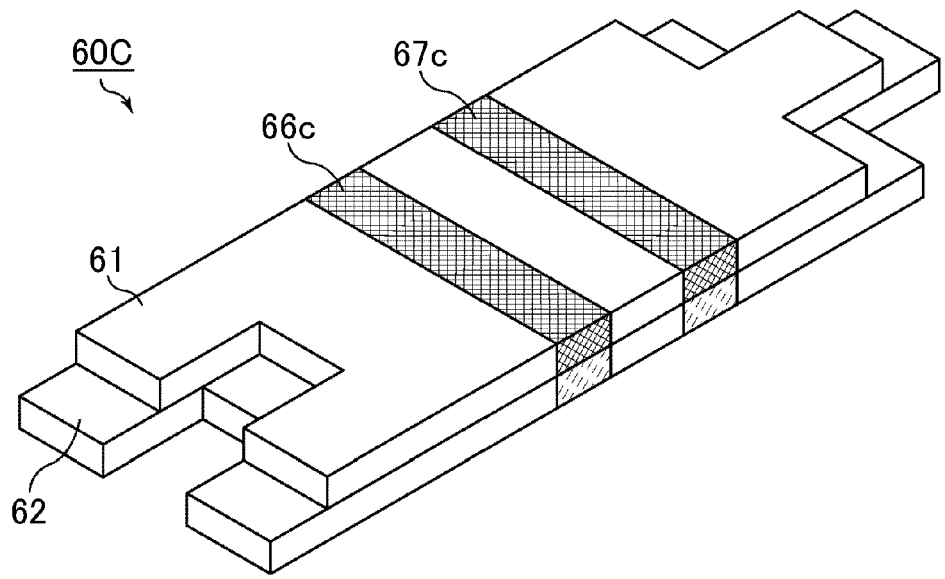
FIG. 20A and FIG. 20B are perspective views schematically showing still another example of a holding sealing material according to the sixth embodiment of the present invention.
Figure 20B:
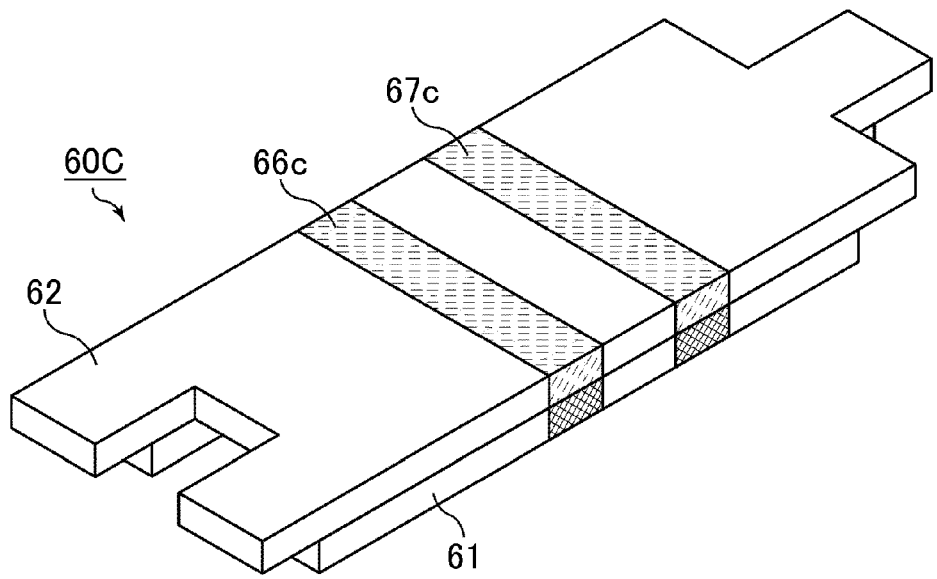

FIG. 20A and FIG. 20B are perspective views schematically showing still another example of a holding sealing material according to the sixth embodiment of the present invention. FIG. 20A is a perspective view of the holding sealing material observed from a first mat side, and FIG. 20B is a perspective view of the holding sealing material observed from a second mat side.

In the holding sealing material 60C shown in FIG. 20A and FIG. 20B, coloring is done on the first belt-shaped body 66c and the second belt-shaped body 67c for displaying the identification data of mats. Practically, the color in the first mat 61 side and the color in the second mat 62 side are different in the first belt-shaped body 66c and the second belt-shaped body 67c.

When the color in the first mat 61 side and the color in the second mat 62 side are different in the first belt-shaped body 66c and the second belt-shaped body 67c, a worker who handles the holding sealing material 60C tends to easily distinguish the front and rear of the holding sealing material 60 (the first mat 61 side and the second mat 62 side) based on the difference of the colors of the belt-shaped bodies.

That is, the coloring can be said to be identification data showing the front and rear of the holding sealing material.

The colors are not particularly limited and may include red, blue, yellow, green, and black colors and color combinations easy for the distinction may be selected among these colors.

For example, a combination of red color for the first mat and black color for the second mat may be possible.

In the case coloring is done on the belt-shaped bodies, the color of the belt-shaped bodies is desirably different from the color of the mats.

In the holding sealing material according to the sixth embodiment of the present invention, in the case coloring is done on belt-shaped bodies, it is no need to carry out coloring on the entire face of the belt-shaped bodies but coloring may be carried out only on a portion of the belt-shaped bodies.

In the holding sealing material according to the sixth embodiment of the present invention, the position where coloring is done is not particularly limited if the coloring for identification data of the mats is done on the belt-shaped bodies.

In the holding sealing material according to the sixth embodiment of the present invention, both printing and coloring may be done on one belt-shaped body.

Further, in the case there are two or more belt-shaped bodies, a belt-shaped body on which only printing is done, a belt-shaped body on which only coloring is done, and a belt-shaped body on which both printing and coloring are done may be combined arbitrarily.

In the holding sealing material according to the sixth embodiment of the present invention, the position of a belt-shaped body where printing and/or coloring is done is not particularly limited but it is desirable that printing and/or coloring is done on the portion of the belt-shaped body positioned on at least one of the first end faces and the second end faces of the mats in the width direction. If the identification data of the mats is displayed on the above-mentioned position of the belt-shaped body, the identification data of the mats tends to be confirmed by seeing the belt-shaped body even after the holding sealing material is wound on the circumference of the exhaust gas treating body.

In the holding sealing material according to the sixth embodiment of the present invention, the printing and/or coloring on the belt-shaped body is desirably done with an organic pigment or an inorganic pigment and more desirably with an inorganic pigment.

When the printing and/or coloring is done with an inorganic pigment on the belt-shaped body, the identification data on the belt-shaped body is more likely to be thermally transferred to the mat in the case the holding sealing material is used in a position such as in the neighborhood of an engine where it becomes a high temperature. Consequently, since it is no need to carry out printing and/or coloring of the identification data directly to the mat, the production efficiency of the holding sealing material is more likely to be improved.

Further, since an inorganic pigment has high heat resistance, the identification data tends to remain even in high temperature environments. Consequently, even in the case the holding sealing material is used in high temperature environments and thereafter becomes defective, the identification data such as production history of the holding sealing material tends to be confirmed.

The holding sealing material according to the sixth embodiment of the present invention is different from the holding sealing materials according to the first to the fifth embodiments of the present invention in a point that printing and/or coloring for displaying identification data of mats is done.

Other configurations of the holding sealing material according to the sixth embodiment of the present invention are similar to that of the holding sealing material according to any of the first to the fifth embodiments of the present invention. Therefore, the explanation of them will be omitted.

The exhaust gas purifying apparatus according to the sixth embodiment of the present invention has the similar configuration to that of the exhaust gas purifying apparatus according to any of the first to the fifth embodiments of the present invention, except that the holding sealing material according to the sixth embodiment of the present invention is used. Therefore, the explanation of them will be omitted.

The method for manufacturing the exhaust gas purifying apparatus according to the sixth embodiment of the present invention has the similar configuration to that of the method for manufacturing the exhaust gas purifying apparatus according to any of the first to the fifth embodiments of the present invention, except that the holding sealing material according to the sixth embodiment of the present invention is used. Therefore, the explanation of them will be omitted.

In the method for manufacturing the exhaust gas purifying apparatus according to the sixth embodiment of the present invention, if a removing step is carried out, it is desirable to remove only the belt-shaped body on which unnecessary identification data is displayed. Removal of the belt-shaped body on which unnecessary identification data is displayed tends to prevent confusion in the manufacturing process. Further, in the case of manufacturing an exhaust gas purifying apparatus using a holding sealing material having, for example, a belt-shaped body displaying the our own manufacture's information and a belt-shaped body displaying the customer information, only the belt-shaped body displaying the our own manufacture's information tends to be removed before the exhaust gas purifying apparatus is transferred to the customer.

The sixth embodiment of the present invention can cause the effects (1) to (11) described in the first to the fifth embodiments of the present invention and also the following effect.

(12) With respect to the holding sealing material of the present embodiment, at least one of printing and coloring for displaying identification data of the mats is done on the belt-shaped body.

When the identification data of the mats is displayed on the belt-shaped body, the identification data of the mats tends to be confirmed by seeing the belt-shaped body.

EXAMPLES

Hereinafter, examples more practically disclosing the first to the sixth embodiments of the present invention will be described. However, the present invention should not be limited to these Examples.

(Production of Holding Sealing Material)

Example 1

As a base mat made of alumina fibers having an alumina-silica composition, there was prepared abase made with a composition ratio of $Al_2O_3:SiO_2=72:28$. This base mat was subjected to needling treatment to produce a needled mat with a bulk density of 0.15 g/cm$^3$ and a weight per unit area of 1500 g/m$^2$.

Separately, an acrylic type latex emulsion was prepared by sufficiently dispersing acrylic type latex in water, and the emulsion was used as a binder.

Next, the needled mat was cut into a plane view size of whole length 980 mm×width 150 mm. The binder was evenly sprayed by using a spray to the cut needled mat in a manner that the weight of the binder became 10 wt % to the alumina fiber weight of the cut needled mat.

Thereafter, the needled mat on which the binder was deposited was dried by air blow at 140° C. for 5 minutes to produce a shortest mat.

Further, a mat positioned on the outer side of the shortest mat was produced in the same manner, except that the whole length was changed to be 1020 mm (hereinafter, sometimes referred to also as the outermost mat). The weight per unit area of the produced two mats was 1500 g/m$^2$. The thickness of both mats was 9 mm.

The two mats produced in the above-mentioned manner were layered in a manner that the bisectioning lines of the respective mats are overlapped up and down.

Next, these two layered mats were bundled by forming belt-shaped bodies at two positions symmetric on the position bisectioning the whole length of the mats.

Practically, the belt-shaped bodies were formed by winding a 30 mm-width tape made of paper on the circumference of the two mats, thereafter cutting the tape, and sticking both ends of the tape made of paper with glue. In that case, the end of a belt-shaped body nearest to the first end face of the mat in the longitudinal direction and the end of a belt-shaped body nearest to the second end face of the mat in the longitudinal direction were positioned at positions of 8% of the whole length of the shortest mat toward the respective end faces of the mats from the bisectioning position of the mats in the longitudinal direction. The adhesive part of the belt-shaped bodies was formed in the outermost mat side.

The holding sealing material was produced according to the above-mentioned process.

Example 2

A holding sealing material was produced in the same manner as that in Example 1, except that the belt-shaped bodies were formed at three positions using the 30 mm-width tape made of paper.

One belt-shaped body was formed at a position in which the center of the belt-shaped body in the width direction was positioned at a position bisectioning the mats in the longitudinal direction. The remaining two belt-shaped bodies were formed at the same positions as those in Example 1.

Example 3

A holding sealing material having belt-shaped bodies at two positions was produced in the same manner as that in Example 1. The positions at which the belt-shaped bodies were formed were also same as those in Example 1.

In Example 3, mats used were those having groove parts with width of 32 mm and depth of 2 mm on the basis of the center line of the belt-shaped bodies to be formed in the first end face and the second end face in the width direction side of the mats.

The groove parts were formed by grinding the end faces of the mats produced in Example 1.

Example 4

A holding sealing material was produced in the same manner as that in Example 1, except that the belt-shaped bodies were formed by using a polyethylene film in place of the tape made of paper.

Example 5

A holding sealing material was produced in the same manner as that in Example 1, except that the belt-shaped body was formed at one position using a 50 mm-width tape made of paper.

The belt-shaped body was formed at a position in which the center of the belt-shaped body in the width direction was positioned at a position bisectioning the mats in the longitudinal direction.

Comparative Example 1

A holding sealing material was produced in the same manner as that in Example 1, except that perforation was carried out at two positions of the belt-shaped bodies formed in Example 1, specifically, at the position of the center line of the belt-shaped bodies (the center of the belt-shaped bodies in the width direction). The perforation was carried out in the entire length of the mats in the width direction.

Comparative Example 2

A holding sealing material was produced in the same manner as that in Example 1, except that perforation was carried out at the position bisectioning the mats in the longitudinal direction. The perforation was carried out in the entire length of the mats in the width direction.

Comparative Example 3

A holding sealing material was produced in the same manner as that in Example 1, except that the mats were stuck on the positions of the belt-shaped bodies formed in Example 1 by using a 30 mm-width adhesive tape.

Comparative Example 4

A holding sealing material was produced in the same manner as that in Example 1, except that the mats were stuck by using a 30 mm-width adhesive tape at the position bisectioning the mats in the longitudinal direction.

The adhesive tape was stuck in a manner that the center of the adhesive tape in the width direction was positioned at a position bisectioning the mats in the longitudinal direction.

Comparative Example 5

A holding sealing material was produced in the same manner as that in Example 1, except that two mats were stuck by applying glue to the entire main faces of the two mats.
(Evaluation of Holding Sealing Material)

A positional deviation test and a winding property test were carried out for the respective holding sealing materials produced in Examples 1 to 5 and Comparative Examples 1 to 5.
(Positional Deviation Test)

Figure 21A:
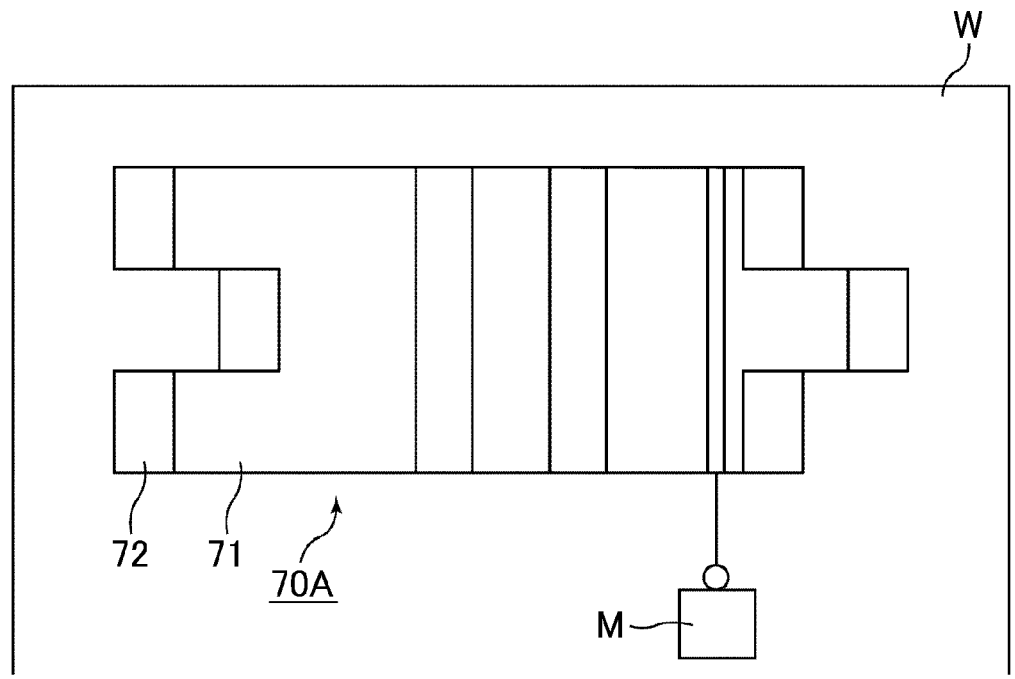
FIG. 21A and FIG. 21B are drawings schematically showing the procedure of carrying out a positional deviation test of a holding sealing material.
Figure 21B:
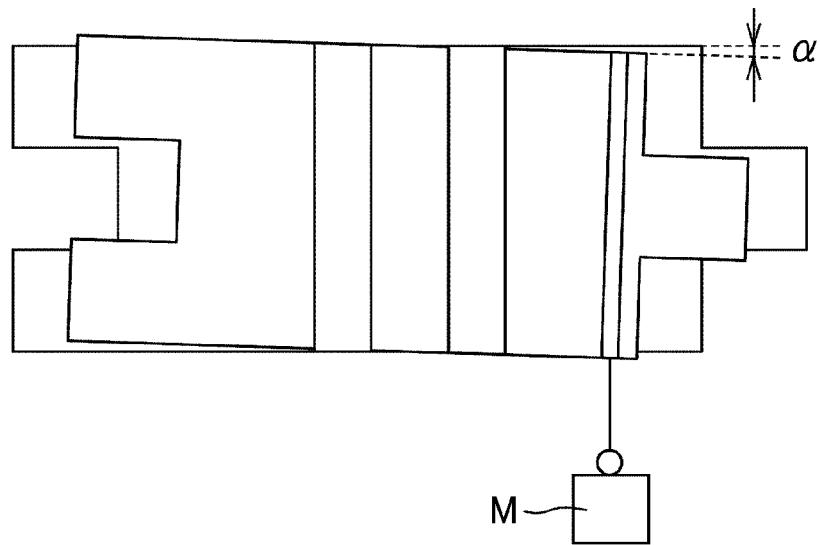

FIG. 21A and FIG. 21B are drawings schematically showing the procedure of carrying out the positional deviation test of a holding sealing material.

As shown in FIG. 21A, a holding sealing material 70A was set in a manner that the width direction was the vertical direction and then the outermost mat 72 between two mats was fixed in the whole length in a wall W. Next, a weight M (250 g; 2.5 N) was hung on one end part of the shortest mat 71, and the distance (mm) between one end part of the outermost mat 72 and the end part of the shortest mat 71 in the same side as the one end part of the outermost mat (the distance shown by "α" in FIG. 21B) was measured as the positional deviation α (mm) to evaluate the positional deviation degree.

The results of the positional deviation test are shown in Table 1. Table 1 shows the evaluation of the positional deviation test as "A" in the case the positional deviation α (mm) was $0 \leq \alpha < 2$; "B" in the case of $2 \leq \alpha < 5$; "C" in the case of $5 \leq \alpha < 10$; and "D" in the case of $10 \leq \alpha$.
(Winding Property Test)

After a produced holding sealing material was wound on an exhaust gas treating body with a diameter of 12 inch, the appearance of the holding sealing material was observed. In the appearance of the holding sealing material in that case, the winding property was evaluated on the basis of the gap β (mm) formed between both end parts of the holding sealing material.

Herein, the whole length of the shortest mat was set to be same as the circumferential length of the exhaust gas treating body. In other words, the designed value of the gap was 0 mm.

The results of the winding property test are shown in Table 1. Table 1 shows the evaluation of the winding property test as "A" in the case the gap β (mm) is β=0; "B" in the case of $0 < \beta < 0.5$; "C" in the case of $0.5 \leq \beta < 1$; and "D" in the case of $1 \leq \beta$.

Table 1 collectively shows the fixation methods of mats, fixation positions of mats, results of the positional deviation test (positional deviation and evaluation), results of the winding property test (gap and evaluation), and comprehensive evaluations for the holding sealing materials produced in Examples 1 to 5 and Comparative Examples 1 to 5.

In Table 1, the worse evaluation between the evaluation of the positional deviation test and the evaluation of the winding property test was employed as the comprehensive evaluation. For example, in the case of Example 1, the evaluation of the positional deviation test was "B" and the evaluation of the winding property test was "A" and therefore, the comprehensive evaluation was "B". Further, in the case of Comparative Example 1, the evaluation of the positional deviation test was "B" and the evaluation of the winding property test was "C" and therefore, the comprehensive evaluation was "C".

TABLE 1

|  | Fixation of mats | | Positional deviation test | | Wrapping property test | | |
| --- | --- | --- | --- | --- | --- | --- | --- |
|  | Fixation method | Fixation position | Positional deviation (mm) | Evaluation | Gap (mm) | Evaluation | Comprehensive Evaluation |
| Example 1 | Belt-shaped body (paper) | 2 | 2 | B | 0 | A | B |
| Example 2 | Belt-shaped body (paper) | 3 | 2 | B | 0 | A | B |
| Example 3 | Belt-shaped body (paper) + groove parts | 2 | 2 | B | 0 | A | B |
| Example 4 | Belt-shaped body (film) | 2 | 2 | B | 0 | A | B |
| Example 5 | Belt-shaped body (paper) | 1 | 2 | B | 0 | A | B |
| Comparative Example 1 | Perforation | 2 | 2 | B | 0.6 | C | C |
| Comparative Example 2 | Perforation | 1 | 7.5 | C | 0 | A | C |
| Comparative Example 3 | Adhesive tape | 2 | 2 | B | 0.6 | C | C |
| Comparative Example 4 | Adhesive tape | 1 | 7.5 | C | 0.2 | B | C |
| Comparative Example 5 | Glue | Whole surface of mat | 1.5 | A | 1.6 | D | D |

In the holding sealing materials of Examples 1 to 5, the positional deviation was slight in the positional deviation test and no gap was formed in the winding property test. Consequently, it is supposed that in the holding sealing materials of Examples 1 to 5, the positional deviation between mats is more likely to be sufficiently suppressed, and in the case the holding sealing materials are wound on the circumference of an exhaust gas treating body, the end faces of the mats (the end faces of the mats in the longitudinal direction) tend to be fitted without any gap.

The reason for that the positional deviation is slight in the holding sealing materials of Examples 1 to 5 is supposed as follows. In the holding sealing materials of Examples 1 to 4, since two mats are bundled by two or three belt-shaped bodies, there is a fixed end in at least one end part side in observation of both end parts of the holding sealing materials from the respective belt-shaped bodies and therefore the degree of freedom of the positional deviation of the mats in the width direction tends to be considerably limited. Further, in the holding sealing material of Example 5, since two mats are bundled by a belt-shaped body with constant width in relation to the length of the mats (the length in the longitudinal direction of the mats), the positional deviation of the mats in the width direction tends to be prevented.

The reason for that no gap is formed in the holding sealing materials of Examples 1 to 5 is supposed as follows. In the holding sealing materials of Examples 1 to 5, two mats are bundled by a belt-shaped body having no fixing force. Consequently, since the mats are not fixed to one another, the mats tend to be shifted in the longitudinal direction at the time of winding the mats on the circumference of an exhaust gas treating body. Therefore, relative positioning between the mats tends to be adjusted finely.

In the holding sealing material of Comparative Example 1, two mats are fixed by perforation at different two positions of the mats in the longitudinal direction. Therefore, the positional deviation was slight in the positional deviation test.

However, since two mats are fixed to each other by perforation, a gap of 0.6 mm was formed in the winding property test. It is supposedly attributed to that at the time of winding the holding sealing material of Comparative Example 1 on the circumference of the exhaust gas treating body, tensile force is generated toward the fixed parts at two positions from the end faces of the mats and as a result, the length of the mats becomes deficient.

In the holding sealing material of Comparative Example 2, two mats are fixed by perforation at one position of the two mats. Therefore, no gap was formed in the winding property test but the positional deviation was significant in the positional deviation test.

In the holding sealing material of Comparative Example 3, two mats are fixed by an adhesive tape at different two positions of the mats in the longitudinal direction. Therefore, similarly to the holding sealing material of Comparative Example 1, the positional deviation was slight in the positional deviation test but a gap was formed in the winding property test.

In the holding sealing material of Comparative Example 4, two mats are fixed by perforation at one position by an adhesive tape. Therefore, similarly to the holding sealing material of Comparative Example 2, no gap was formed in the winding property test but the positional deviation was significant in the positional deviation test.

In the holding sealing material of Comparative Example 5, two mats are stuck to each other by glue. Since two mats are stuck, the positional deviation was the slightest in the positional deviation test. However, at the time of winding the holding sealing material on the circumference of the exhaust gas treating body, tensile force for pulling the end faces of the mats was significant and therefore, the gap formed in the winding property test was the widest.

From the above-mentioned results, in a holding sealing material obtained by layering a plurality of mats, it is supposed that the positional deviation of the mats in the width direction can be made slight, and a holding sealing material excellent in the winding property is more likely to be obtained by bundling of a plurality of mats with a belt-shaped body having substantially a constant width and having no fixing force.

Other Embodiments

With respect to the holding sealing materials according to the first to the sixth embodiments of the present invention, the whole lengths of a plurality of mats (the lengths of mats in the longitudinal direction) are made longer as they are layered more.

As described, in a holding sealing material according to an embodiment of the present invention, it is desirable that the whole lengths of a plurality of mats are made longer as they are layered more; however, the whole lengths of the mats to be layered may be substantially the same.

In the case a holding sealing material having layered mats which all have substantially the same whole length is wound on the circumference of an exhaust gas treating body, the length of the mat in the outer side becomes deficient and therefore, the end faces of the mat tend not to be fitted without any gap; however, at least in the end faces of the shortest mat, fitting tends to be done without any gap.

Further, in a holding sealing material according to an embodiment of the present invention, in the case all mats to be layered have substantially the same whole length, the holding sealing material tends to be brought into contact with the exhaust gas treating body in any side of main faces of the mats. Consequently, since it is no need to distinguish the front or rear of the holding sealing material at the time of winding the holding sealing material, the production efficiency of the exhaust gas purifying apparatus is more likely to be improved.

In this case, the adhesive part of the belt-shaped body is desirably positioned in the first end face or the second end face of the mat in the width direction. It is because if the adhesive part of the belt-shaped body is positioned in the main face of the mat, it is necessary to consider which main face between the main face of the mat having the adhesive part and the main face of the mat having no adhesive part should be brought into contact with the exhaust gas treating body; however if the adhesive part of the belt-shaped body is positioned in the first end face or the second end face of the mat in the width direction, it is no need to consider that point.

In a holding sealing material according to an embodiment of the present invention, in the case an adhesive part is formed in one belt-shaped body, the number of the adhesive part is desirably one; however the number of the adhesive part may be two.

For example, one adhesive part may be positioned in the main face of a first mat, and the other adhesive part may be positioned in the main face of a second mat. Further, one adhesive part may be positioned in the first end face of the mat in the width direction, and the other adhesive part may be positioned in the second end face of the mat in the width direction. Of course, two adhesive parts may be positioned in a single face of the mats.

Moreover, in a holding sealing material of an embodiment of the present invention, in the case an adhesive part is formed in one belt-shaped body, the number of the adhesive part may be three or more.

Moreover, in a holding sealing material of an embodiment of the present invention, in the case a plurality of mats are bundled by two or more belt-shaped bodies, the number of the adhesive part may be same for the respective belt-shaped bodies or may be different.

In a holding sealing material of an embodiment of the present invention, in the case one adhesive part is formed in one belt-shaped body, the adhesive part may be positioned while striding over the main face of the mat and end face of the mat in the width direction.

In a holding sealing material of an embodiment of the present invention, no adhesive part may be formed in a belt-shaped body.

Moreover, in a holding sealing material of an embodiment of the present invention, in the case a plurality of mats are bundled by two or more belt-shaped bodies, a belt-shaped body having an adhesive part and a belt-shaped body having no adhesive part may coexist.

In a holding sealing material according to an embodiment of the present invention, the state that mats are layered is not limited to the state that the shortest mat is layered at a position in which the shortest mat does not come off either end of the other mat in a plane view as shown in FIG. 1A and FIG. 1B.

For example, the shortest mat and a mat having whole length longer than the whole length of the shortest mat (hereinafter, sometimes referred to also as longer mat) may be layered while being shifted to each other in the longitudinal direction. Practically, in a plane view observation, the state that the left end of the shortest mat comes off the left end of the longer mat and the right end of the longer mat significantly comes off the right end of the shortest mat is allowable.

Further, the state that the left end of the mat having whole length longer than the whole length of the shortest mat is set evenly and the right end of the longer mat comes off the right end of the shortest mat is also allowable.

The forms of the recessed portion and the projected portion formed in the shorter side of a holding sealing material according to an embodiment of the present invention are not particularly limited if the recessed portion and the projected portion are fitted. However, in the case a pair of a recessed portion and a projected portion are formed, it is desirable that a projected portion with width about 10 mm×length about 10 mm to width about 300 mm×length about 100 mm is projected in a portion of one shorter side, while a recessed portion with a form to be fitted with that is formed in a portion of the other shorter side.

In the case an exhaust gas purifying apparatus is manufactured by using a holding sealing material having such a recessed portion and projected portion, since the exhaust gas treating body tends to be reliably held by the holding sealing material and thus the handling property becomes excellent.

In the case the size of the projected portion is width about 10 mm×length about 10 mm or larger and in the case the projected portion is width about 300 mm×length about 100 mm or smaller, when the holding sealing material is wound on an exhaust gas treating body, the contact surface area of the end faces of the holding sealing material is not too narrow, and thus the end faces of the holding sealing material tend to be brought into contact with each other. As a result, it becomes easier for the holding sealing material to hold the exhaust gas treating body.

In a holding sealing material of an embodiment of the present invention, a plurality of recessed portions and projected portions to be fitted with each other may be formed in the shorter side of the holding sealing material, and neither recessed portion nor projected portion may be formed.

In a holding sealing material according to an embodiment of the present invention, the inorganic fibers composing the mats are not particularly limited and may be alumina-silica fibers, and also alumina fibers, silica fibers, etc. Further, the fibers may be glass fibers. The fibers may be changed in accordance with the properties such as heat resistance and resistance to wind erosion which the holding sealing material is required to have. In the case alumina-silica fibers are used as the inorganic fibers, fibers having a composition ratio of alumina and silica by a weight ratio of $Al_2O_3:SiO_2$=about (60:40) to about (80:20) can be used.

In the above composition ratio, if alumina is contained not more than the desirable upper limit ($Al_2O_3:SiO_2$=about (80:20)) of the alumina composition ratio, crystallization of alumina-silica tends not to be advanced and thus the flexibility of the inorganic fibers tends not to be lost. In the above composition ratio, if the ratio of alumina is not less than the desirable lower limit ($Al_2O_3:SiO_2$=about (60:40)), heat resistance temperature at a high temperature tends not to be decreased and the rigidity of the inorganic fibers tends not to become insufficient and it becomes easier to generate the surface pressure sufficiently on the mat surface to hold the exhaust gas treating body.

In a holding sealing material according to an embodiment of the present invention, the average fiber length of the inorganic fibers composing the mats is desirably from about 30 μm to about 120 mm and more preferably from about 50 μm to about 100 mm.

If the average fiber length of the inorganic fibers is about 30 μm or more, the fiber length of the inorganic fibers is not too short, and thus the inorganic fibers are more likely to be entwined sufficiently, and the shear strength of the holding sealing material tends to be high. If the average fiber length of the inorganic fibers is about 120 mm or less, since the fiber length of the inorganic fibers is not too long, and thus the handling property of the inorganic fibers tends not to be lowered at the time of producing the holding sealing material. As a result, the winding property of the holding sealing material on the exhaust gas treating body tends not to be deteriorated, and the holding sealing material tends not to be cracked.

In a holding sealing material according to an embodiment of the present invention, the average fiber diameter of the inorganic fibers composing the mats is desirably from about 2 μm to about 15 μm and more preferably from about 3 μm to about 12 μm.

If the average fiber diameter of the inorganic fibers is from about 2 μm to about 15 μm, the strength and flexibility of the inorganic fibers tend to be sufficiently high, and thus the shear strength of the holding sealing material tends to be improved.

If the average fiber diameter of the inorganic fibers is about 2 μm or more, since the inorganic fibers are not too thin and become hardly disconnected, the tensile strength of the inorganic fibers tends to be sufficient. On the other hand, if the average fiber diameter of the inorganic fibers is about 15 μm or less, since the inorganic fibers tend to be bent, the flexibility tends to be sufficient.

In a holding sealing material according to an embodiment of the present invention, the weight per unit area of the mats is not particularly limited and desirably from about 200 g/m² to about 4000 g/m² and more desirably from about 1000 g/m² to about 3000 g/m². If the weight per unit area of a holding sealing material is about 200 g/m² or more, the holding force of the holding sealing material is more likely to be sufficient, and if the weight per unit area of a holding sealing material is about 4000 g/m² or less, the bulkiness of the holding sealing material tends to be low. Therefore, in the case of manufacturing an exhaust gas purifying apparatus using such a holding sealing material, the exhaust gas treating body tends to be hardly dropped off a casing.

The bulk density of a holding sealing material (the bulk density of a holding sealing material before a wound body is stuffed in a casing) is also not particularly limited and desirably from about 0.10 g/cm³ to about 0.30 g/cm³. If the bulk density of a holding sealing material is about 0.10 g/cm³ or more, the inorganic fibers are entwined strongly and are hardly separated and therefore, it becomes easier to keep the form of the holding sealing material as a prescribed form. If the bulk density of a holding sealing material is about 0.30 g/cm³ or less, the holding sealing material tends not to become hard and the winding property of it on an exhaust gas treating body tends not to be deteriorated and therefore the holding sealing material tends not to be cracked.

In a holding sealing material according to an embodiment of the present invention, the thickness of one mat is not particularly limited and desirably from about 1.5 mm to about 50 mm and more desirably from about 6 mm to about 20 mm.

If the thickness of one mat is about 1.5 mm or more, the holding force of the holding sealing material is more likely to be sufficient. Therefore, in the case of manufacturing an exhaust gas purifying apparatus using such a holding sealing material, the exhaust gas treating body tends not to be dropped off a casing. On the other hand, if the thickness of one mat is about 50 mm or less, since the holding sealing material becomes not too thick, the winding property of it on an exhaust gas treating body tends not to be deteriorated and the holding sealing material tends not to be cracked.

The thicknesses of the respective mats may be approximately same or different from one another. The thickness may be changed properly in consideration of the flexibility or holding force which a holding sealing material is required to have.

In the case a mat composing a holding sealing material according to an embodiment of the present invention is a needled mat, the needled mat can be produced, for example, by the following method.

(1) Spinning Step

Silica sol is added to an aqueous basic aluminum chloride solution prepared in a manner that the aluminum content and the atomic ratio of Al and Cl become specified values, to give a composition ratio of inorganic fibers after firing of $Al_2O_3:SiO_2$=about (60:40) to about (80:20) (weight ratio). Further, a proper amount of an organic polymer is added for improving the formability to prepare a mixed solution.

The obtained mixed solution is concentrated to obtain a mixture for spinning, and the mixture for spinning is spun by a blowing method to produce an inorganic fiber precursor having an average fiber diameter of from about 3 μm to about 10 μm.

In this description, the blowing method means a method for spinning the inorganic fiber precursor by supplying the mixture for spinning extruded out of a nozzle for supplying a mixture for spinning to high speed gas flow (air glow) blown out of an air nozzle.

(2) Compression Step

Next, the above-mentioned inorganic fiber precursor is compressed to produce a continuous sheet-like product in a prescribed size.

(3) Needling Step

A needle board to which needles are attached in a density of from about 7 pcs/cm² to about 30 pcs/cm² is set above one surface of the sheet-like product. The needle board is moved up and down once along the thickness direction of the sheet-like product to carry out the needling treatment and thus produce a needled product. In this case, needles penetrate the sheet-like product so completely as to make the barbs formed at the tips of the needles come out of the surface in the reverse side.

Needle pushing-in traces are formed in the points where the needles pierce in the surface of the needled product obtained by the needling treatment, and needle pushing-out traces are formed in the points where the needles come out in the surface of the needled product. In the needle pushing-out traces, the inorganic precursor in bundled state that the inorganic precursor is oriented in closed loop state is formed.

(4) Firing Step

Successively, the needled product is continuously fired at the highest temperature of about 1000 to about 1600° C. to produce a fired mat (needled mat).

In the above-mentioned steps, a needled mat can be produced.

In a holding sealing material according to an embodiment of the present invention, examples of the organic binder to be used for producing the holding sealing material are not limited to an acrylic resin and may include rubber such as acrylic rubber, a water-soluble organic polymer such as carboxymethyl cellulose and polyvinyl alcohol, a thermoplastic resin such as a styrene resin, and a thermosetting resin such as an epoxy resin. Among them, acrylic rubber, acrylonitrile-butadiene rubber, and styrene-butadiene rubber are particularly desirable.

In a holding sealing material according to an embodiment of the present invention, an emulsion (binder solution) to be used for producing the holding sealing material may contain a plurality of the above-mentioned organic binders.

The above-mentioned binder solution may be latex obtained by dispersing the above-mentioned organic binder in water and also a solution by dissolving the above-mentioned organic binder in water or an organic solvent.

In a holding sealing material according to an embodiment of the present invention, an emulsion (binder solution) to be used for producing the holding sealing material may further contain an inorganic binder.

In the case an inorganic binder is contained in the binder solution, examples to be used as the inorganic binder may include alumina sol and silica sol.

A material of a casing composing an exhaust gas purifying apparatus according to an embodiment of the present invention is not particularly limited if it is a metal having heat resistance and practically, it may be metals such as stainless steel, aluminum, iron, etc.

The form of a casing composing an exhaust gas purifying apparatus according to an embodiment of the present invention may be an approximately cylindrical form, and also a clamshell type form, a down-sizing type form, etc. are preferably used.

The form of an exhaust gas treating body composing an exhaust gas purifying apparatus according to an embodiment of the present invention is not particularly limited if it is a pillar-shaped form. Besides an approximately round pillar-shaped form, arbitrary forms and sizes such as an approximately cylindroid form and an approximately rectangular pillar-shaped form are also allowed.

An exhaust gas treating body composing an exhaust gas purifying apparatus according to an embodiment of the present invention may be an integrated honeycomb structure made of cordierite and the like and formed integrally as shown in FIG. 5, or may be an aggregated honeycomb structure made of silicon carbide and the like and formed by bonding a plurality of pillar-shaped honeycomb fired bodies, in which a large number of through holes are longitudinally disposed in parallel with one another with partition walls therebetween, by interposing an adhesive layer containing mainly ceramic.

A catalyst may be supported on an exhaust gas treating body composing an exhaust gas purifying apparatus according to an embodiment of the present invention.

Examples of a catalyst supported on the exhaust gas treating body may be a noble metal such as platinum, palladium, and rhodium; an alkali metal such as potassium and sodium; an alkaline earth metal such as barium; and a metal oxide such as cerium oxide. These catalysts may be used alone or two or more kinds of them may be used in combination.

In an exhaust gas purifying apparatus according to an embodiment of the present invention, in the case the exhaust gas treating body is a honeycomb structure, no plug material may be provided in the cells and the end parts of the cells may not be sealed. In this case, the exhaust gas treating body functions as a catalyst supporting carrier for purifying harmful gas components such as CO, HC or $NO_x$ contained in exhaust gas by supporting a catalyst such as platinum or the like.

In a holding sealing material according to the embodiment of the present invention, essential features are that a plurality of mats including inorganic fibers are layered and the plurality of mats are bundled by at least one belt-shaped body having no fixing force. Further, in an exhaust gas purifying apparatus according to the embodiment of the present invention and a method for manufacturing an exhaust gas purifying apparatus according to the embodiment of the present invention, use of the holding sealing material according to the embodiment of the present invention is an essential feature.

Desired effects are more likely to be obtained by properly combining the various kinds of configurations described in detail in the first to sixth embodiments of the present invention and other embodiments of the present invention (e.g., the configuration of a belt-shaped body, presence or absence and configuration of an adhesive part, presence or absence of a groove part, presence or absence of printing and/or coloring, etc.) with the above-mentioned essential features.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A holding sealing material comprising:
    a plurality of mats comprising inorganic fibers and being layered; and
    at least one belt-shaped body, said plurality of mats being bundled by said at least one belt-shaped body, said at least one belt-shaped body having no fixing force which fixes said plurality of mats to said at least one belt-shaped body,
    wherein
    said at least one belt-shaped body consists of one belt-shaped body,
    the plurality of mats are bundled by the one belt-shaped body,
    said plurality of mats include a shortest mat having a length which is shortest among said plurality of mats in a longitudinal direction, and
    a width of the belt-shaped body is about 30% or less of the length of the shortest mat.

2. The holding sealing material according to claim 1, wherein
said plurality of mats have a first width end face and a second width end face in a width direction, and have a groove part in each of the first width end face and the second width end face, and
the groove part engages a part of said at least one belt-shaped body.

3. A holding sealing material comprising:
a plurality of mats comprising inorganic fibers and being layered; and
at least one belt-shaped body, said plurality of mats being bundled by said at least one belt-shaped body, said at least one belt-shaped body having no fixing force which fixes said plurality of mats to said at least one belt-shaped body,
wherein
said at least one belt-shaped body includes two or more belt-shaped bodies,
said plurality of mats are bundled by the two or more belt-shaped bodies,
said plurality of mats include a shortest mat having a length which is shortest among said plurality of mats in a longitudinal direction,
the shortest mat has a first longitudinal end face and a second longitudinal end face in the longitudinal direction,
the two or more belt-shaped bodies have a first width end portion and a second width end portion in a width direction, wherein the first width end portion is nearest to the first longitudinal end face in the two or more belt-shaped bodies, and the second width end portion is nearest to the second longitudinal end face in the two or more belt-shaped bodies, and
a distance between the first width end portion and the second width end portion is about 30% or less of the length of the shortest mat.

4. A holding sealing material comprising:
a plurality of mats comprising inorganic fibers and being layered; and
at least one belt-shaped body, said plurality of mats being bundled by said at least one belt-shaped body, said at least one belt-shaped body having no fixing force which fixes said plurality of mats to said at least one belt-shaped body,
wherein
said at least one belt-shaped body includes two or more belt-shaped bodies,
said plurality of mats are bundled by the two or more belt-shaped bodies,
said plurality of mats include a shortest mat having a length which is shortest among said plurality of mats in a longitudinal direction,
the shortest mat has a first longitudinal end face and a second longitudinal end face in the longitudinal direction,
the two or more belt-shaped bodies have a first width end portion and a second width end portion in a width direction, wherein the first width end portion is nearest to the first longitudinal end face in the two or more belt-shaped bodies, and the second width end portion is nearest to the second longitudinal end face in the two or more belt-shaped bodies,
the first width end portion is positioned at a position of from about 5% to about 45% of the length of the shortest mat toward the first longitudinal end face from a bisectioning position of the shortest mat in the longitudinal direction, and
the second width end portion is positioned at a position of from about 5% to about 45% of the length of the shortest mat toward the second longitudinal end face from the bisectioning position of the shortest mat in the longitudinal direction.

5. The holding sealing material according to claim 1, wherein
a width of each of said at least one belt-shaped body is from about 10 mm to about 100 mm.

6. The holding sealing material according to claim 1, wherein
said at least one belt-shaped body is made of paper or a film.

7. The holding sealing material according to claim 6, wherein
said at least one belt-shaped body is made of a film, and
a material composing said film is polyethylene or polyolefin.

8. The holding sealing material according to claim 1, wherein
each of said at least one belt-shaped body has end parts at both ends in a longitudinal direction of the each of said at least one belt-shaped body, and
at least one of the end parts is stuck on the each of said at least one belt-shaped body via an adhesive part.

9. The holding sealing material according to claim 8, wherein
the adhesive part is positioned on a main face of one of the plurality of mats.

10. The holding sealing material according to claim 8, wherein
each of said plurality of mats has a first width end face and a second width end face in a width direction, and
the adhesive part is positioned on the first width end face or the second width end face of at least one of the plurality of mats.

11. The holding sealing material according to claim 1, wherein
at least one of printing and coloring for displaying identification data of said plurality of mats is done on said at least one belt-shaped body.

12. The holding sealing material according to claim 11, wherein
said plurality of mats have a first width end face and a second width end face in a width direction, and
at least one of said printing and said coloring is done on a portion of the at least one belt-shaped body positioned on at least one of the first width end face and the second width end face of said plurality of mats.

13. The holding sealing material according to claim 11, wherein
at least one of said printing and said coloring is done with an inorganic pigment.

14. An exhaust gas purifying apparatus comprising:
a casing;
an exhaust gas treating body housed in said casing; and
a holding sealing material wound on a circumference of said exhaust gas treating body and provided between said exhaust gas treating body and said casing, the holding sealing material comprising:
a plurality of mats including inorganic fibers and being layered; and
at least one belt-shaped body, said plurality of mats being bundled by said at least one belt-shaped body, said at least one belt-shaped body having no fixing force which fixes said plurality of mats to said at least one belt-shaped body, wherein said at least one belt-shaped body consists of one belt-shaped body, the plurality of mats are bundled by the one belt-shaped body, said plurality of mats include a shortest mat having a length which is shortest among said plurality of mats in a longitudinal direction, and a width of the belt-shaped body is about 30% or less of the length of the shortest mat.

15. The exhaust gas purifying apparatus according to claim 14, wherein each of said at least one belt-shaped body has end parts at both ends in a longitudinal direction of the each of said at least one belt-shaped body, at least one of the end parts is stuck on the each of said at least one belt-shaped body via an adhesive part, and the adhesive part is positioned on a main face of a mat in an opposed side to a side to be brought into contact with said exhaust gas treating body or on a main face of a mat in a side having contact with said exhaust gas treating body.

16. The exhaust gas purifying apparatus according to claim 14, wherein each of said at least one belt-shaped body has end parts at both ends in a longitudinal direction of the each of said at least one belt-shaped body, at least one of the end parts is stuck on the each of said at least one belt-shaped body via an adhesive part, each of said plurality of mats has a first width end face and a second width end face in a width direction, and the adhesive part is positioned on the first width end face or the second width end face of at least one of the plurality of mats.

17. The exhaust gas purifying apparatus according to claim 14, wherein said plurality of mats have a first width end face and a second width end face in a width direction, and have a groove part in each of the first width end face and the second width end face, and the grove part engages a part of said at least one belt-shaped body.

18. An exhaust gas purifying apparatus comprising:

a casing;

an exhaust gas treating body housed in said casing; and a holding sealing material wound on a circumference of said exhaust gas treating body and provided between said exhaust gas treating body and said casing, the holding sealing material comprising:

a plurality of mats including inorganic fibers and being layered; and at least one belt-shaped body, said plurality of mats being bundled by said at least one belt-shaped body, said at least one belt-shaped body having no fixing force which fixes said plurality of mats to said at least one belt-shaped body, wherein said at least one belt-shaped body includes two or more belt-shaped bodies, said plurality of mats are bundled by the two or more belt-shaped bodies, said plurality of mats include a shortest mat having a length which is shortest among said plurality of mats in a longitudinal direction, the shortest mat has a first longitudinal end face and a second longitudinal end face in the longitudinal direction, the two or more belt-shaped bodies have a first width end portion and a second width end portion in a width direction, wherein the first width end portion is nearest to the first longitudinal end face in the two or more belt-shaped bodies, and the second width end portion is nearest to the second longitudinal end face in the two or more belt-shaped bodies, and a distance between the first width end portion and the second width end portion is about 30% or less of the length of the shortest mat.

19. An exhaust gas purifying apparatus comprising:

a casing;

an exhaust gas treating body housed in said casing; and a holding sealing material wound on a circumference of said exhaust gas treating body and provided between said exhaust gas treating body and said casing, the holding sealing material comprising:

a plurality of mats including inorganic fibers and being layered; and at least one belt-shaped body, said plurality of mats being bundled by said at least one belt-shaped body, said at least one belt-shaped body having no fixing force which fixes said plurality of mats to said at least one belt-shaped body, wherein said at least one belt-shaped body includes two or more belt-shaped bodies, said plurality of mats are bundled by the two or more belt-shaped bodies, said plurality of mats include a shortest mat having a length which is shortest among said plurality of mats in a longitudinal direction, the shortest mat has a first longitudinal end face and a second longitudinal end face in the longitudinal direction, the two or more belt-shaped bodies have a first width end portion and a second width end portion in a width direction, wherein the first width end portion is nearest to the first longitudinal end face in the two or more belt-shaped bodies, and the second width end portion is nearest to the second longitudinal end face in the two or more belt-shaped bodies, the first width end portion is positioned at a position of from about 5% to about 45% of the length of the shortest mat toward the first longitudinal end face from a bisectioning position of the shortest mat in the longitudinal direction, and the second width end portion is positioned at a position of from about 5% to about 45% of the length of the shortest mat toward the second longitudinal end face from the bisectioning position of the shortest mat in the longitudinal direction.

20. The exhaust gas purifying apparatus according to claim 14, wherein a width of each of said at least one belt-shaped body is from about 10 mm to about 100 mm.

21. The exhaust gas purifying apparatus according to claim 14, wherein said at least one belt-shaped body is made of paper or a film.

22. The exhaust gas purifying apparatus according to claim 21,
wherein
said at least one belt-shaped body is made of a film, and
a material composing said film is polyethylene or polyolefin.

23. The exhaust gas purifying apparatus according to claim 14,
wherein
each of said at least one belt-shaped body has end parts at both ends in a longitudinal direction of the each of said at least one belt-shaped body, and
at least one of the end parts is stuck on the each of said at least one belt-shaped body via an adhesive part.

24. The exhaust gas purifying apparatus according to claim 14,
wherein
at least one of printing and coloring for displaying identification data of said plurality of mats is done on said at least one belt-shaped body.

25. The exhaust gas purifying apparatus according to claim 24,
wherein
said plurality of mats have a first width end face and a second width end face in a width direction, and
at least one of said printing and said coloring is done on a portion of the at least one belt-shaped body positioned on at least one of the first width end face and the second width end face of said plurality of mats.

26. The exhaust gas purifying apparatus according to claim 24,
wherein
at least one of said printing and said coloring is done with an inorganic pigment.

27. A method for manufacturing an exhaust gas purifying apparatus, comprising:
housing an exhaust gas treating body in a casing, the exhaust gas treating body being wound with a holding sealing material on a circumference of the exhaust gas treating body so that the holding sealing material is provided between said exhaust gas treating body and said casing after the housing of the exhaust gas treating body, the holding sealing material including a plurality of mats which include inorganic fibers and which are layered and at least one belt-shaped body, said plurality of mats being bundled by said at least one belt-shaped body, said at least one belt-shaped body having no fixing force which fixes said plurality of mats to said at least one belt-shaped body,
wherein
said at least one belt-shaped body consists of one belt-shaped body,
the plurality of mats are bundled by the one belt-shaped body
said plurality of mats include a shortest mat having a length which is shortest among said plurality of mats in a longitudinal direction, and
a width of the belt-shaped body is about 30% or less of the length of the shortest mat.

28. The method according to claim 27, further comprising:
winding said holding sealing material on the circumference of said exhaust gas treating body before said housing of the exhaust gas treating body,
wherein
a holding sealing material in which each of said at least one belt-shaped body has end parts at both ends in a longitudinal direction of the each of said at least one belt-shaped body, in which at least one of the end parts is stuck on the each of said at least one belt-shaped body via an adhesive part, and in which the adhesive part is positioned on a main face of one of the plurality of mats is used as said holding sealing material, and
in said winding of the said holding sealing material, the holding sealing material is wound on the circumference of said exhaust gas treating body in a manner that a main face of one of the plurality of mats in an opposed side to a side where the adhesive part is positioned is brought into contact with said exhaust gas treating body, or a main face of one of the plurality of mats in a side where the adhesive part of said belt-shaped body is positioned is brought into contact with said exhaust gas treating body.

29. The method according to claim 27,
wherein
each of said plurality of mats has a first width end face and a second width end face in a width direction, and
a holding sealing material in which each of said at least one belt-shaped body has end parts at both ends in a longitudinal direction of the each of said at least one belt-shaped body, in which at least one of the end parts is stuck on the each of said at least one belt-shaped body via an adhesive part, and in which the adhesive part is positioned on the first width end face or the second width end face of at least one of the plurality of mats is used as said holding sealing material.

30. The method according to claim 27, further comprising:
winding said holding sealing material on the circumference of said exhaust gas treating body before said housing of the exhaust gas treating body; and
removing the at least one belt-shaped body composing said holding sealing material after said winding of said holding sealing material and before said housing of the exhaust gas treating body.

31. The method according to claim 27,
wherein
said plurality of mats have a first width end face and a second width end face in a width direction, and have a groove part in each of the first width end face and the second width end face, and
the groove part engages a part of said at least one belt-shaped body.

32. A method for manufacturing an exhaust gas purifying apparatus, comprising:
housing an exhaust gas treating body in a casing, the exhaust gas treating body being wound with a holding sealing material on a circumference of the exhaust gas treating body so that the holding sealing material is provided between said exhaust gas treating body and said casing after the housing of the exhaust gas treating body, the holding sealing material including a plurality of mats which include inorganic fibers and which are layered and at least one belt-shaped body, said plurality of mats being bundled by said at least one belt-shaped body, said at least one belt-shaped body having no fixing force which fixes said plurality of mats to said at least one belt-shaped body,
wherein
said at least one belt-shaped body includes two or more belt-shaped bodies,
said plurality of mats are bundled by the two or more belt-shaped bodies, said plurality of mats include a shortest mat having a length which is shortest among said plurality of mats in a longitudinal direction, the shortest mat has a first longitudinal end face and a second longitudinal end face in the longitudinal direction, the two or more belt-shaped bodies have a first width end portion and a second width end portion in a width direction, wherein the first width end portion is nearest to the first longitudinal end face in the two or more belt-shaped bodies, and the second width end portion is nearest to the second longitudinal end face in the two or more belt-shaped bodies, and a distance between the first width end portion and the second width end portion is about 30% or less of the length of the shortest mat.

33. A method for manufacturing an exhaust gas purifying apparatus, comprising:

housing an exhaust gas treating body in a casing, the exhaust gas treating body being wound with a holding sealing material on a circumference of the exhaust gas treating body so that the holding sealing material is provided between said exhaust gas treating body and said casing after the housing of the exhaust gas treating body, the holding sealing material including a plurality of mats which include inorganic fibers and which are layered and at least one belt-shaped body, said plurality of mats being bundled by said at least one belt-shaped body, said at least one belt-shaped body having no fixing force which fixes said plurality of mats to said at least one belt-shaped body, wherein said at least one belt-shaped body includes two or more belt-shaped bodies, said plurality of mats are bundled by the two or more belt-shaped bodies, said plurality of mats include a shortest mat having a length which is shortest among said plurality of mats in a longitudinal direction, the shortest mat has a first longitudinal end face and a second longitudinal end face in the longitudinal direction, the two or more belt-shaped bodies have a first width end portion and a second width end portion in a width direction, wherein the first width end portion is nearest to the first longitudinal end face in the two or more belt-shaped bodies, and the second width end portion is nearest to the second longitudinal end face in the two or more belt-shaped bodies, the first width end portion is positioned at a position of from about 5% to about 45% of the length of the shortest mat toward the first longitudinal end face from a bisectioning position of the shortest mat in the longitudinal direction, and the second width end portion is positioned at a position of from about 5% to about 45% of the length of the shortest mat toward the second longitudinal end face from the bisectioning position of the shortest mat in the longitudinal direction.

34. The method according to claim 27,
wherein
a width of each of said at least one belt-shaped body is from about 10 mm to about 100 mm.

35. The method according to claim 27,
wherein
said at least one belt-shaped body is made of paper or a film.

36. The method according to claim 35,
wherein
said at least one belt-shaped body is made of a film, and
a material composing said film is polyethylene or polyolefin.

37. The method according to claim 27,
wherein
each of said at least one belt-shaped body has end parts at both ends in a longitudinal direction of the each of said at least one belt-shaped body, and
at least one of the end parts is stuck on the each of said at least one belt-shaped body via an adhesive part.

38. The method according to claim 27,
wherein
at least one of printing and coloring for displaying identification data of said plurality of mats is done on said at least one belt-shaped body.

39. The method according to claim 38,
wherein
said plurality of mats have a first width end face and a second width end face in a width direction, and
at least one of said printing and said coloring is done on a portion of the at least one belt-shaped body positioned on at least one of the first width end face and the second width end face of said plurality of mats.

40. The method according to claim 38,
wherein
at least one of said printing and said coloring is done with an inorganic pigment.

41. The method according to claim 32, further comprising:
winding said holding sealing material on the circumference of said exhaust gas treating body before said housing of the exhaust gas treating body; and
removing the at least one belt-shaped body composing said holding sealing material after said winding of said holding sealing material and before said housing of the exhaust gas treating body,
wherein
at least one of printing and coloring for displaying identification data of said plurality of mats is done on said at least one belt-shaped body among the two or more belt-shaped bodies, and
in said removing of the at least one belt-shaped body, only a belt-shaped body bearing unnecessary identification data is removed.

42. The method according to claim 33, further comprising:
winding said holding sealing material on the circumference of said exhaust gas treating body before said housing of the exhaust gas treating body; and
removing the at least one belt-shaped body composing said holding sealing material after said winding of said holding sealing material and before said housing of the exhaust gas treating body,
wherein
at least one of printing and coloring for displaying identification data of said plurality of mats is done on said at least one belt-shaped body among the two or more belt-shaped bodies, and
in said removing of the at least one belt-shaped body, only a belt-shaped body bearing unnecessary identification data is removed.

* * * * *

UNITED STATES PATENT AND TRADEMARK OFFICE
CERTIFICATE OF CORRECTION

| | | |
|---|---|---|
| PATENT NO. | : 8,663,357 B2 | Page 1 of 1 |
| APPLICATION NO. | : 13/459027 | |
| DATED | : March 4, 2014 | |
| INVENTOR(S) | : Kenichi Mitani and Takahiko Okabe | |

It is certified that error appears in the above-identified patent and that said Letters Patent is hereby corrected as shown below:

In the Claims

Column 47, Line 47, Claim 17, the line should read as follows:

the groove part engages a part of said at least one belt-shaped

Signed and Sealed this
Twenty-seventh Day of May, 2014

Michelle K. Lee
*Deputy Director of the United States Patent and Trademark Office*